United States Patent
Shen et al.

(10) Patent No.: US 9,497,459 B2
(45) Date of Patent: Nov. 15, 2016

(54) METHOD AND APPARATUS FOR DETECTING FRAME TYPES

(71) Applicants: Huawei Technologies Co., Ltd., Shenzhen, Guangdong (CN); UNIVERSITY OF SCIENCE AND TECHNOLOGY OF CHINA, Hefei, Anhui (CN)

(72) Inventors: Qiu Shen, Shenzhen (CN); Qingpeng Xie, Shenzhen (CN); Dong Zhang, Hefei (CN); Houqiang Li, Hefei (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 685 days.

(21) Appl. No.: 13/919,674

(22) Filed: Jun. 17, 2013

(65) Prior Publication Data

US 2013/0279585 A1    Oct. 24, 2013

Related U.S. Application Data

(63) Continuation of application No. PCT/CN2011/080343, filed on Sep. 29, 2011.

(30) Foreign Application Priority Data

Dec. 17, 2010  (CN) .......................... 2010 1 0594322

(51) Int. Cl.
*H04N 19/503* (2014.01)
*H04N 19/89* (2014.01)
*H04N 19/577* (2014.01)

(52) U.S. Cl.
CPC ...... *H04N 19/00721* (2013.01); *H04N 19/503* (2014.11); *H04N 19/89* (2014.11)

(58) Field of Classification Search
CPC .................... H04N 19/00721; H04N 19/503; H04N 19/89
USPC ................................................... 375/240.15
See application file for complete search history.

(56) References Cited

U.S. PATENT DOCUMENTS

2006/0088286 A1* 4/2006 Shibata ............... G11B 27/005
                                                     386/344
2007/0280361 A1   12/2007 Kwon et al.
(Continued)

FOREIGN PATENT DOCUMENTS

CN        1211877 A        3/1999
CN        1379937 A       11/2002
(Continued)

OTHER PUBLICATIONS

Wei Zeng and Wen Gao, "Shot change detection on H.264/AVC compressed video," 2005 IEEE International Symposium on Circuits and Systems, 2005, pp. 3459-3462 vol. 4.*
"Information technology—Coding of audio-visual objects—Part 2: Visual," International Standard ISO/IEC 14496-2, Second Edition, ISO/IEC (Dec. 1, 2001).
(Continued)

*Primary Examiner* — William C Vaughn, Jr.
*Assistant Examiner* — Jae N Noh
(74) *Attorney, Agent, or Firm* — Leydig, Voit & Mayer, Ltd.

(57) ABSTRACT

Embodiments of the present invention disclose a method and an apparatus for detecting frame types. The method includes: detecting play time of each frame; and if the play time of a current frame is less than the maximum play time of received frames, determining the current frame as a bi-directional predicted frame, B-frame. In the technical solutions provided by the embodiments of the present invention, the frame types are determined according to a coding sequence of various frames and comparison between data amounts of various frames received earlier and later, without decoding a payload. Therefore the impact of a reduction factor is eliminated and the frame types can be detected more accurately.

21 Claims, 9 Drawing Sheets

(56) References Cited

U.S. PATENT DOCUMENTS

| | | | |
|---|---|---|---|
| 2009/0041114 A1 | 2/2009 | Clark | |
| 2009/0180534 A1* | 7/2009 | Hluchyj | H04N 21/23406 375/240.01 |
| 2010/0166388 A1 | 7/2010 | Ushiki | |
| 2013/0219443 A1* | 8/2013 | Argyropoulos | H04N 17/00 725/109 |
| 2015/0003530 A1* | 1/2015 | Gao | H04N 17/004 375/240.15 |

FOREIGN PATENT DOCUMENTS

| | | |
|---|---|---|
| CN | 1549604 A | 11/2004 |
| CN | 101426137 A | 5/2009 |
| CN | 101438615 A | 5/2009 |
| CN | 101518657 A | 9/2009 |
| CN | 101558657 A | 10/2009 |
| CN | 101626507 A | 1/2010 |
| CN | 101651815 A | 2/2010 |
| EP | 1608087 A1 | 12/2005 |
| EP | 2077672 A1 | 7/2009 |
| EP | 2413535 A1 | 2/2012 |
| WO | WO 2006008673 A1 | 1/2006 |
| WO | WO 2009012297 A1 | 1/2009 |
| WO | WO 2009154529 A1 | 12/2009 |

OTHER PUBLICATIONS

Kikuchi et al., "RTP Payload Format for MPEG-4 Audio/Visual Streams," memo, Network Working Group, The Internet Society (Nov. 2000).

Wenger et al., "RTP Payload Format for H.264 Video," memo, Network Working Group, The Internet Society (Feb. 2005).

"Infrastructure of audiovisual services—Transmission multiplexing and synchronization: Information technology—Generic coding of moving pictures and associated audio information: Systems," *Series H: Audiovisual and Multimedia Systems*, H.222.0, ITU (May 2006).

"Infrastructure of audiovisual services—Coding of moving video: Advanced video coding for generic audiovisual services," *Series H: Audiovisual and Multimedia Systems*, H.264, ITU (Mar. 2010).

"Models and tools for quality assessment of streamed media: Parametric non-intrusive assessment of audiovisual media streaming quality—higher resolution application area," *Series P: Terminals and Subjective and Objective Assessment Methods*, P.1201.2, ITU (Oct. 2012).

Written Opinion of the International Searching Authority in corresponding PCT Patent Application No. PCT/CN2011/080343 (Jan. 19, 2012).

International Search Report in corresponding PCT Patent Application No. PCT/CN2011/080343 (Jan. 19, 2012).

Hoffman et al., "RTP Payload Format for MPEG1/MPEG2 Video," Request for Comments 2038, Network Working Group, (Oct. 1996).

\* cited by examiner

METHOD AND APPARATUS FOR DETECTING FRAME TYPES

CROSS-REFERENCE TO RELATED APPLICATIONS

This application is a continuation of International Patent Application No. PCT/CN2011/080343, filed on Sep. 29, 2011, which claims priority to Chinese Patent Application No. 201010594322.5, filed on Dec. 17, 2010, both of which are hereby incorporated by reference in their entireties.

FIELD OF THE INVENTION

The present invention relates to the field of video processing technologies, and in particular, to a method and an apparatus for detecting frame types.

BACKGROUND OF THE INVENTION

According to video coding standards, decodable data frame types include intra coded frames (I-Frames), unidirectional predicted frames (P-Frames), and bi-directional predicted frames (B-Frames, Bi-directional predicted frames, B-frames). In video applications, an I-frame is used as the start of decodable data, and is generally referred to as a random access point. The I-frame may provide services such as random access and quick browsing. In a transmission process, errors of different frame types affect the subjective quality of a decoder differently. The I-frame is capable of truncating error propagation. Therefore, if an error occurs in the I-frame, the error has a great impact on the overall video decoding quality. The P-frame is usually used as a reference frame for other inter coded frames, and is less important than the I-frame. The B-frame is usually not used as a reference frame, and therefore the loss of the B-frame does not have an obvious impact on the video decoding quality.

Thus, it is significant to distinguish different types of frames in a data stream in a video transmission application. For example, a frame type is an important parameter for evaluating video quality, and the accuracy of determining the frame type directly affects the accuracy of the evaluation result. Differential protection may be provided for different types of frames in a video so that the video can be transmitted effectively. In addition, to save transmission resources, when the bandwidth is insufficient, some frames that do not affect the subjective quality greatly may be discarded.

The Internet Streaming Media Alliance (ISMA) and Moving Picture Expert Group-2 Transport Stream over Internet Protocol (MPEG-2 TS over IP) are two frequently used stream transmission technologies. The two protocol modes are both designed with an indicator that can indicate a video data type in the encapsulation of a compressed video data stream. The ISMA mode encapsulates the compressed video data stream by directly using the Real-time Transport Protocol (RTP), where MPEG-4 Part2 complies with RFC 3016 (Request For Comments 3016, RFC 3016), and H.264/Aural and Visual Code (AVC) complies with RFC 3984. Taking RFC 3984 as an example, an RTP header includes a sequence number and a timestamp, which can be used to determine frame loss and help to detect the frame type. The MPEG-2 TS over IP mode also includes two modes: transport stream over User Datagram Protocol/IP (TS over UDP/IP) and transport stream over Real-time Transport Protocol/UDP/IP (TS over RTP/UDP/IP). In video transmission, the TS over RTP/UDP/IP (abbreviated to "TS over RTP" hereinafter in this application) is frequently used to encapsulate a compressed video data stream into an elementary stream, further divide the elementary stream into a plurality of TS packets, and finally use the RTP to encapsulate and transmit the TS packets.

The RTP is a transport protocol for multimedia data streams, which is responsible for end-to-end real-time data transmission. An RTP packet mainly includes four parts: an RTP header, an RTP extension header, a payload header, and payload data. The RTP header mainly includes the following data: a sequence number, a timestamp and an indicator. The sequence numbers correspond to the RTP packets on a one-to-one basis. Every time when a packet is sent, the sequence number increases by 1. The sequence number may be used to detect packet loss. The timestamp may indicate the sampling time of video data. Different frames have different timestamps, which may indicate the play sequence of the video data. The indicator is used to indicate the end of a frame. The preceding information is an important basis for determining a frame type.

A TS packet includes 188 bytes. The TS packet is made up of a packet header, a variable-length adaptation header, and payload data. A payload unit start indicator (PUSI) indicates whether the payload data includes a packetized elementary stream (PES) header or program specific information (PSI). With respect to the H.264 media format, each PES packet header predicts the start of a NAL unit. Some indicators in a TS packet adaptation field, such as a random access indicator and an elementary stream priority indicator, may be used to determine the importance of transport content. For a video, if the random access indicator is 1, a subsequent first PES packet includes sequence start information, and if the elementary stream priority indicator is 1, the payload content of the TS packet includes a lot of Intra block data.

If it is determined by using the PUSI that the payload part of the TS packet includes a PES packet header, information useful for transmission may be further discovered. The PES packet is made up of a PES packet header and packet data after the PES packet header. Original stream data (video and audio) is encapsulated in the PES packet data. The PES packet is inserted in a transport stream packet. The first byte in each PES packet header is the first byte of the payload of the transport stream packet. To be specific, a PES packet header must be included in a new TS packet, and meanwhile the payload area of the TS packet must be fully filled with the PES packet data. If the end of the PES packet data cannot be aligned with the end of the TS packet, an appropriate number of padding bytes need to be inserted in the adaptation area of the TS packet so that the ends of the two are aligned. The PES priority indicates the importance of the payload in the PES packet data. For a video, the value 1 indicates Intra data. In addition, a PTS indicates the display time, and a DTS indicates the decoding time. The PTS and DTS may be used to determine the correlation between earlier video payload content and later video payload content so as to determine the payload type.

In the TS over the RTP mode, to protect the video copyright content in transmission, the payload is usually encrypted for transmission in the transmission process. To encrypt the TS packet is to encrypt the payload part of the packet. If the scrambling flag in the TS packet header is set to 1, the payload in the packet is encrypted. In this case, the payload data type can only be determined by using the size of a data packet having the same PID between adjacent PUSIs (equivalent to the size of a video frame). If the PES packet header in the TS packet is not encrypted, in addition to the length of the video frame, the PTS may also be used to help determine the frame type.

As known from the preceding description, the amount of data in data frames varies depending on the frame types. The I-frame, without intra redundancy only, generally has a larger data amount than an inter coded frame without inter redundancy, while the P-frame generally has a larger data amount than the B-frame. In view of this feature, at present, some frame type detection algorithms use the data amount of a frame to determine the frame type in the case of TS packet encryption. Two more frequently used methods are described herein.

Method 1: Obtain the length of each video frame by parsing a TS packet, and infer the frame type by using the length information. The proposed method is used to determine the frame type in the case that the payload part of a TS packet is already encrypted.

The method determines the packet loss status by parsing the Continuity Counter field in the TS packet, estimates the lost packet status by using previous group of pictures (GOP) structure information before the determination, and determines the type of the video frame with reference to available information (i.e., Random Access Indicator, RAI or Elementary Stream Priority Indicator, ESPI) of the adaptation field in the TS packet header.

Three methods below may be used to identify an I-frame.

1. Use a RAI or an ESPI to identify an I-frame.

2. If the RAI or ESPI cannot be used to identify an I-frame, buffer the data of one GOP, use a maximum value in the currently buffered data as an I-frame, where the GOP length needs to be predefined, and once the GOP length changes, the method becomes invalid.

3. Use a value indicating the maximum GOP length as a determined I-frame period, and use a frame having the maximum data amount as an I-frame in the determined period, where the determined period is a maximum one of the detected I-frame periods.

For a P-frame, three methods below may be used.

1. Among frames from a start frame to a frame immediately preceding an I-frame, select a frame having a larger data amount than all the other frames as a P-frame. With respect to determined frame modes included in a GOP structure for processing a target stream, select consecutive frames corresponding to N determined frame modes in a determined period as determined target frames, match the data amounts of the determined target frames with the determined frame modes, and determine a P-frame based on the matching therebetween. In the GOP structure, use the following mode as a determined frame mode: The mode includes all consecutive B-frames immediately preceding a P-frame and a B-frame next to the P-frame. In this case, some information of the GOP needs to be input beforehand.

2. Compare the frame data amount of each frame in a presentation mode with a threshold that is calculated based on an average of frame data amounts of multiple frames in predetermined positions in the presentation mode.

3. Based on frame data amounts, use an adjustment coefficient to adjust the threshold for distinguishing P-frames from B-frames. Adjustment coefficient: In a given range, sequentially select temporary adjustment coefficients to perform processing same as the processing of determining frame types, so as to estimate the frame type of each frame in a given determined period. Then calculate a ratio of wrongly determined frame types according to the estimation results and the actual frame types obtained from an unencrypted stream, obtain a temporary adjustment coefficient having a lowest ratio of wrong determination, and use this coefficient as a real adjustment coefficient.

A method for determining B-frames is: determining all frames other than I-frames and P-frames as B-frames.

In the case of packet loss, the preceding methods for determining frame types are capable of detecting the packet loss based on an RTP sequence number and a Continuity Counter (CC) in a TS packet header, and estimating the lost packet status by mode matching by using a GOP structure, thereby achieving correction to some extent. However, for the method using a nonadjustable threshold, GOP information needs to be input beforehand; and for the method using an adjustable threshold, coefficients need to be trained by using the frame type information obtained from an unencrypted stream, and a lot of human intervention is required. In addition, a GOP needs to be buffered before the frame types are estimated. Therefore, the methods are not applicable to real-time applications. Moreover, the I-frame is determined only once. The adjustable coefficient is a period. If a maximum data amount is directly obtained from each period and used as an I-frame, only the local features are considered, and the global features are not considered.

Method 2: The method of using thresholds to distinguish different frames may include four steps.

1. Update Thresholds:
Threshold for distinguishing an I-frame (Ithresh):
scaled_max_iframe=scaled_max_iframe*0.995, where scaled_max_iframe is the size of a previous I-frame.
If nbytes>scaled_max_iframe,
then ithresh=(scaled_max_iframe/4+av_nbytes*2)/2, where av_nbytes is the moving average of current 8 frames.
Threshold for distinguishing a P-frame (Pthresh):
scaled_max_pframe=scaled_max_pframe*0.995, where scaled_max_pframe is the size of a previous P-frame.
If nbytes>scaled_max_pframe, then pthresh=av_nbytes*0.75.

2. Detect an I-frame: In a video, there is an I-frame in each period of time. The data amount of the I-frame is larger than the average and larger than the data amount of the P-frame. If the data amount of the current frame is larger than Ithresh, the frame is considered as an I-frame.

3. Detect a P-frame: Utilize the data amount of a B-frame is smaller than the average. If the data amount of the current frame is larger than Pthresh but smaller than Ithresh, the frame is considered as a P-frame.

4. Other Frames are B-Frames.

The second method for determining frame types uses a reduction factor to control the thresholds. The factor has a direct impact on determining an I-frame. When a subsequent I-frame is larger than the current I-frame, the I-frame can be easily determined. However, when the subsequent I-frame is far smaller than the current I-frame, the I-frame can be determined only after reduction of many frames. Furthermore, the reduction factor in the algorithm is fixed to 0.995, without considering sharp changes of GOPs. Therefore, the method is not applicable in many cases. If the reduction factor is small, the ratio of undetected I-frames is low, and meanwhile, and the probability of wrongly determining P-frames as I-frames is high. If the reduction factor is large, the ratio of undetected I-frames is high (when the size of the I-frame changes sharply in a sequence), and I-frames may be wrongly determined as P-frames. Therefore, the detection accuracy is low. In addition, because only thresholds are used to determine B-frames or P-frames, in a frame structure of I/P/P/P . . . , the algorithm may wrongly determine many P-frames as B-frames, resulting in a high ratio of wrongly determined frames.

SUMMARY OF THE INVENTION

The embodiments of the present invention provide a method and an apparatus for detecting frame types, so that the frame types can be detected more accurately.

To solve the technical problems, the method for detecting frame types according to the embodiments of the present invention may be implemented by the following technical solutions:

detecting play time of each frame; and if the play time of a current frame is less than the maximum play time of a received frame, determining the current frame as a bi-directional predicted frame, B-frame.

A method for detecting frame types includes:

obtaining a coding type of a bitstream including the received frames, where the coding type includes open-loop coding and closed-loop coding;

if a data amount of a current frame is larger than a first threshold, determining the current frame as an obvious intra coded frame, I-frame, where the first threshold is obtained by calculation according to an average data amount of a specified number of consecutive frames and the data amount of the I-frame;

if a frame previous to the current frame is an I-frame and the coding type is closed-loop coding and the current frame is a non-obvious I-frame, or if the frame previous to the current frame is an I-frame and the coding type is open-loop coding and the data amount of the current frame is larger than a fourth threshold, determining the current frame as a unidirectional predicted frame, P-frame, where the fourth threshold is an average of an average data amount of P-frames and an average data amount of B-frames in a group of pictures; and if the current frame is neither an I-frame nor a P-frame, determining the current frame as a B-frame.

An apparatus for detecting frame types includes:

a time detecting unit, configured to detect play time of each frame; and a frame type determining unit, configured to determine a current frame as a bi-directional predicted frame, B-frame, if the play time of the current frame is less than the maximum play time of received frames.

An apparatus for detecting frame types includes:

a type obtaining unit, configured to obtain a coding type of a bitstream including received frames, where the coding type includes open-loop coding and closed-loop coding; and a frame type determining unit, configured to: if a data amount of a current frame is larger than a first threshold, determine the current frame as an obvious I-frame, where the first threshold is obtained by calculation according to an average data amount of a specified number of consecutive frames and the data amount of the I-frame;

if a frame previous to the current frame is an I-frame and the coding type is closed-loop coding and the current frame is a non-obvious I-frame, or if a frame previous to the current frame is an I-frame and the coding type is open-loop coding and the data amount of the current frame is larger than a fourth threshold, determine the current frame as a P-frame, where the fourth threshold is an average of an average data amount of P-frames and an average data amount of B-frames in a group of pictures; and if the current frame is neither an I-frame nor a P-frame, determine the current frame as a B-frame.

In the technical solutions provided by the embodiments of the present invention, the frame types are determined according to the coding sequence of various frames and comparison between data amounts of various frames received earlier and later, without decoding a payload. Therefore the impact of a reduction factor is eliminated and the frame types can be detected more accurately.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other accompanying drawings from the accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1A:
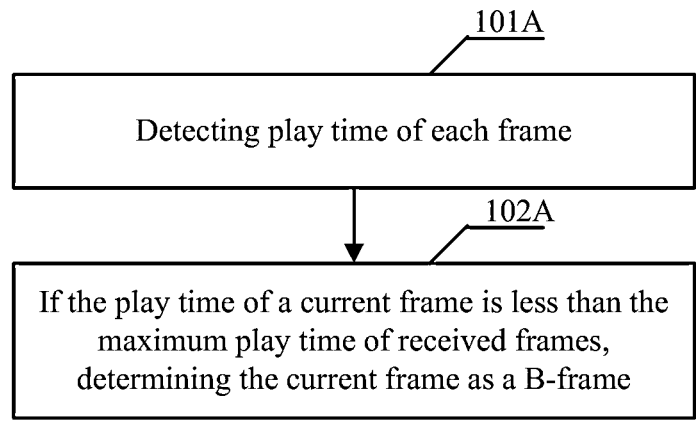
FIG. 1A is a schematic flowchart of a method according to an embodiment of the present invention.

As shown in FIG. 1A, a method for detecting frame types includes:

101A: detecting play time of each frame; and

102A: if the play time of a current frame is less than the maximum play time of received frames, determining the current frame as a bi-directional predicted frame, B-frame.

Further, the embodiment of the present invention may further be: according to a play sequence and coding sequence of each frame, determining a layer to which the B-frame belongs in hierarchical coding. The method for determining layers will be further described hereinafter. Based on the features of B-frames, if the layers of B-frames are determined, applications may be found in many fields, for example, during the compression of data frames, B-frames at higher layers may be discarded. The applications after the layers of B-frames are determined are not limited in the embodiment of the present invention.

In the embodiment, the frame types are determined according to the coding sequence of various frames and comparison between data amounts of various frames received earlier and later, without decoding a payload. Therefore the impact of a reduction factor is eliminated and the frame types can be detected more accurately.

Figure 1B:
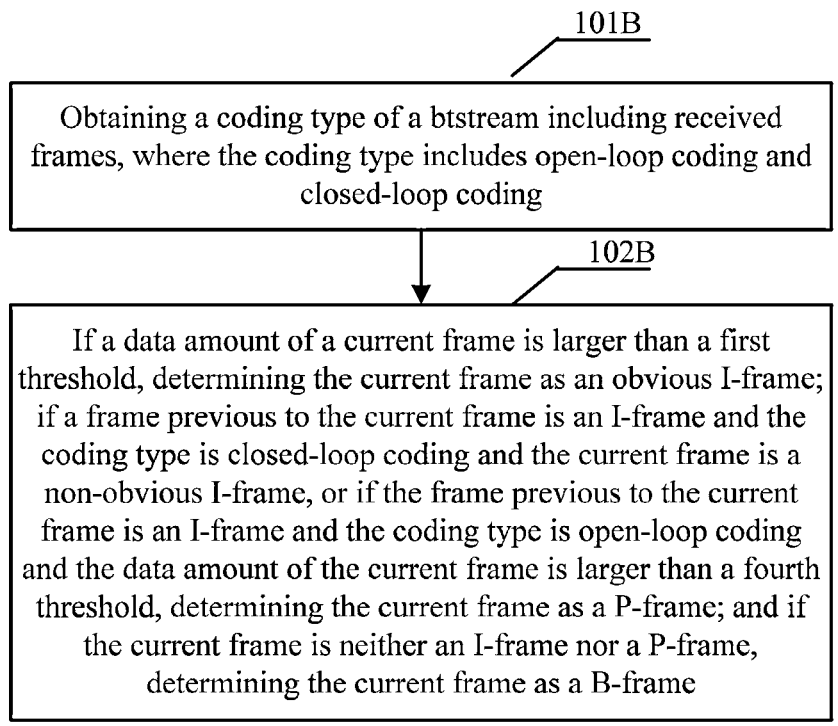
FIG. 1B is a schematic flowchart of a method according to an embodiment of the present invention.

As shown in FIG. 1B, an embodiment of the present invention further provides another method for detecting frame types, including:

101B: obtaining a coding type of a bitstream including received frames, where the coding type includes open-loop coding and closed-loop coding; and 102B: if a data amount of a current frame is larger than a first threshold, determining the current frame as an obvious I-frame, where the first threshold is obtained by calculation according to an average data amount of a specified number of consecutive frames and the data amount of the I-frame;

where, the obvious I-frame is an I-frame, and if the frame is determined as an obvious I-frame, the probability of wrong determination is low, but it is possible that some I-frames are undetermined, and in the other modes for determining I-frames, some frames may be wrongly determined as I-frames;

if a frame previous to the current frame is an I-frame and the coding type is closed-loop coding and the current frame is a non-obvious I-frame (the frame type of the current frame is not clear at this time, but whether the current frame is an obvious I-frame may be determined), or if the frame previous to the current frame is an I-frame and the coding type is open-loop coding and the data amount of the current frame is larger than a fourth threshold, determining the current frame as a P-frame, where the fourth threshold is an average of an average data amount of P-frames and an average data amount of B-frames in a group of pictures; and if the current frame is neither an I-frame nor a P-frame, determining the current frame as a B-frame.

It should be noted that the method corresponding to FIG. 1B may be applied independently, or used in combination with the method of FIG. 1A. If used in combination, the method of FIG. 1B is applicable when the play time in FIG. 1A fails to be detected.

The obtaining the coding type of a bitstream including received frames includes:

counting the type of a frame next to an obvious I-frame, and if a ratio of P-frames reaches a specified ratio, determining that the coding type is closed-loop coding, or otherwise determining that the coding type is open-loop coding.

In the following embodiment, the solution of FIG. 1B and the solution of FIG. 1A are combined as an example for description. If the solution of FIG. 1B is used independently, it is not necessary to check whether the play time can be detected.

Further, in 101A, if the play time fails to be detected, the method embodiment further includes:

if the data amount of current frame is larger than a second threshold, determining the current frame as an I-frame, where the second threshold is a maximum one of the data amount of an I-frame previous to the current frame, the average data amount of P-frames in the group of pictures including the current frame, and the average data amount of the specified number of consecutive frames.

Further, in 101A, if the play time fails to be detected, the method embodiment further includes:

if the data amount of current frame is larger than a third threshold and an interval between the current frame and a previous I-frame is longer than a fixed interval, determining the current frame as an I-frame, where the third threshold is obtained by calculation according to an average data amount of frames in the group of pictures including the current frame, a difference between the distance from the previous I-frame to the current frame and an expected fixed I-frame interval, the data amount of a P-frame previous to the current frame, and the data amount of the I-frame in the group of pictures including the current frame, or the third threshold is obtained by calculation according to the average data amount of frames in the group of pictures including the current frame and the difference between the distance from the previous I-frame to the current frame and the expected fixed I-frame interval.

Further, in 101A, if the play time fails to be detected, the method embodiment further includes:

if the frame previous to the current frame is a P-frame and the data amount of the current frame is larger than a fifth threshold, or if the group of pictures comprising the current frame includes B-frames and the data amount of the current frame is larger than a sixth threshold, determining the current frame as a P-frame, where the fifth threshold is a product of a first adjustment factor and the average data amount of P-frames in the group of pictures including the current frame, where the first adjustment factor is larger than 0.5 and smaller than 1, and the sixth threshold is the average of the average data amount of P-frames and the average data amount of B-frames; and if the frame previous to the current frame is a B-frame and the data amount of the current frame is smaller than a seventh threshold, or if the group of pictures comprising the current frame includes P-frames and the data amount of the current frame is smaller than an eighth threshold, determining the current frame as a P-frame, where the seventh threshold is a product of a second adjustment factor and the average data amount of B-frames in the group of pictures including the current frame, where the second adjustment factor is larger than 1 and smaller than 1.5, and the eighth threshold is the average of the average data amount of P-frames and the average data amount of B-frames.

Further, in 101A, if the play time fails to be detected, the method embodiment further includes:

after frame type determination ends, determining a fixed I-frame interval, and after the fixed interval expires, if it is still determined that no I-frame exists, determining a frame having a maximum data amount in a specified range in the fixed interval as an I-frame; and updating average data amounts of various frames in the group of pictures and an I-frame interval parameter.

Further, in 101A, if the play time fails to be detected, the method embodiment further includes:

after frame type determination ends, counting consecutive B-frames, and if the number of consecutive B-frames is larger than a predicted value, determining a frame having a maximum data amount among the consecutive B-frames as a P-frame, and updating average data amounts of various frames in the group of pictures, where the predicted value is larger than or equal to 3 and smaller than or equal to 7.

Further, in 101A, if the play time fails to be detected, the method embodiment further includes:

determining whether any packet of a received frame is lost, and if packet loss occurs, determining a packet loss type;

if the packet loss type is packet loss occurred in intra frame, when calculating the data amount of the frame, determining a sum of the data amount of the received frame and the data amount of the lost packet as the data amount of the frame; and if the packet loss type is packet loss occurred in inter frame, determining whether a flag of a packet previous to the lost packet is 1, and if so, counting the data amount of the lost packet into a next frame, or otherwise, evenly allocating the data amount of the lost packet to the previous frame and the next frame.

Further, the determining a packet loss type includes:

predicting a coding structure by counting the detected types of frames; and if the packet loss type is packet loss occurred in inter frame and the flag of the packet previous to the position of the lost packet fails to be detected, dividing the length of current data according to the predicted coding structure and the position of the lost packet.

The embodiment of the present invention fully uses RTP or TS over RTP packet header information in combination with the coding sequence of various frames in a video and comparison between data amounts of various frames received earlier and later to quickly determine the frame types in real time without decoding a payload of the video, and improves the accuracy of the detected frame types by means of packet loss processing, automatic parameter update, and later frame type correction.

In a video stream, there is packet header information indicating the play time of video data, for example, an RTP timestamp in the ISMA mode and a PTS of a PES packet header in the TS over RTP mode. The embodiment of the present invention uses the relationship between play time information and the coding sequence to determine the coding types of some special structures, such as B-frames. However, in the TS over RTP mode, it is possible that a TS payload is completely encrypted and that a PES packet header cannot be decoded, that is, no PTS is available. Therefore, an embodiment of the present invention further provides a solution that uses information such as data amount information other than the play time to determine frame types.

By observing video streams in actual applications, obvious differences may be found between different types of frames in a same GOP. To be specific, an I-frame has a largest data amount, a P-frame has a moderate data amount, and a B-frame has the smallest data amount. If the I-frame in the start position of each GOP can be identified correctly, the data amount of the frame may be used to determine the P-frames and B-frames in the GOP. However, due to instability of video signals, the data amounts of I-frames in different positions vary greatly, and are even equal to the data amounts of P-frames in earlier GOPs. This makes it difficult to determine I-frames. In an embodiment of the present invention, a set of intelligently adjustable dynamic parameters is designed to improve the robustness and accuracy of determining the frame types. In particular, in the process of determining I-frames, determination rules and related parameters are appropriately adjusted by fully considering the features of I-frames in different application scenarios, so that the ratio of wrongly determined I-frames is greatly reduced.

In an application scenario of lossy transmission, packet loss may occur in an input video stream. Packet loss may be classified into two types according to its impact on a determination process: 1. packet loss occurred in intra frame; 2. packet loss at a frame boundary. In the case of packet loss occurred in intra frame, because information of the frame boundary is not lost, the frame boundary may be first obtained, and then the corresponding sequence numbers may be used to count the number of packets in one frame. In the case of packet loss at the frame boundary (for example, a packet whose flag is 1 in RTP, or a packet whose PUSI is set to 1 in TS over RTP), the boundary between two adjacent frames may fail to be determined, or the data of two adjacent frames may be counted into one frame, so that the calculated data amount of the frame is incorrect, which affects the result of determining the frame type. The embodiment of the present invention discusses packet loss detection, frame boundary estimation, and estimation of some frame types.

At the early stage of determining the frame types, because of insufficient statistics data, many frames may be wrongly determined, which not only affects an existing output result, but also affects the accuracy of later determination by changing various parameters. In the embodiment of the present invention, frame type correction is added after the process of determining the frame types. After data is increased, if an obvious error exists in the output result, internal correction is performed. Although the internal correction cannot change the frame type already output, the accuracy of later determination may be improved by adjusting parameters.

Three key points of the embodiment of the present invention are hereinafter described in detail respectively.

1. Using the Play Time to Determine B-Frames or/and Hierarchical B-Frames:

Because B-frames are predicted by using forward and backward coded frames and are coded after backward reference frames, the play time of the B-frames is always inconsistent with the coding sequence. Therefore, the play time information may be used to determine the B-frames. If the play time of the current frame is less than the maximum play time of received frames, the frame is definitely a B-frame, or otherwise, the frame is an I-frame or a P-frame.

Figure 2A:
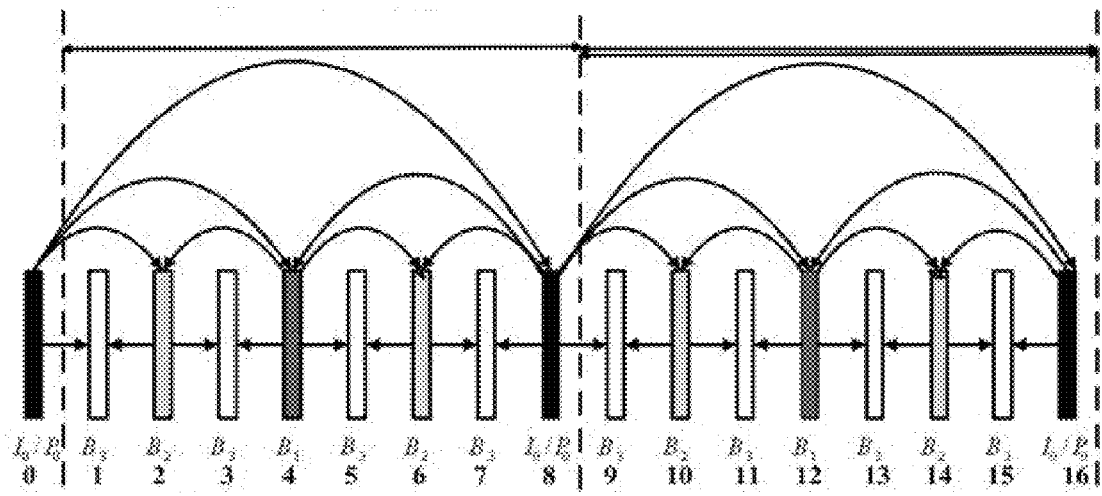
FIG. 2a is a schematic diagram of a coding structure of hierarchical B-frames according to an embodiment of the present invention.
Figure 2B:
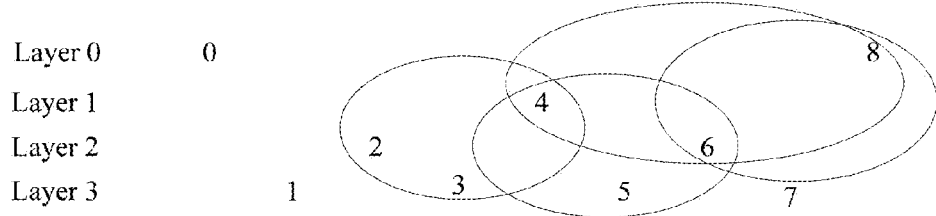
FIG. 2b is a schematic diagram illustrating the relationship between a coding sequence and a play sequence, and layers of coding according to an embodiment of the present invention.

For B-frames in hierarchical coding, the play time may also be used to further determine the highest layer and the layer of each B-frame. The case of 7 consecutive B-frames is used as an example. In this case, as shown in FIG. 2a, which illustrates a coding structure diagram of hierarchical B-frames, subscripts to letters in the first row indicate the layer of each frame, and the numbers in the second row indicate the play sequence number of each frame. The actual coding sequence is (the numbers in brackets are play sequence numbers): I0/P0(0), I0/P0 (8), B1(4), B2(2), B3(1), B3(3), B2(6), B3(5), B3(7). FIG. 2b illustrates the relationship between the coding sequence and the play sequence, and layers of coding, where Arabic numbers indicate the play sequence numbers, and Chinese numbers indicate the coding sequence numbers.

The algorithm that uses the play time for determining layers may include two steps.

Step 1: Determine the highest layer (3 in this example). Set the layer of frame 0 to 0, and then read the play time according to the coding sequence. If the play time of the current frame is less than the play time of the previous frame, the layer of the current frame is equal to the layer of the previous frame plus 1, or otherwise, the layer of the current frame is the same as the layer of the previous frame. This process continues until a frame, frame 1, which immediately follows frame 0, is read. At this time, the layer corresponding to frame 1 is the highest layer.

Step 2: Determine the layers of remaining frames according to the symmetry of the play time of adjacent B-frames. After step 1 is complete, the layers in the solid block in FIG. 2(b) are determined. At this time, the layers of B-frames in the dotted block need to be determined. The detection method is to traverse the frames whose layers are already determined, in order to find two frames, where an average of the play time of the two frames is equal to the play time of the current frame. Then the layer of the current frame is equal to the maximum layer of the two frames plus 1. The symmetry is displayed by the ellipses in the figure, that is, the average of the play time of the two upper frames in each ellipse is equal to the play time of the lowest frame therein, and the layer of the lowest frame is just equal to the maximum layer of the two upper frames plus 1.

2. Using the Data Amount of a Frame to Determine the Frame Type:

Because only B-frames can be determined according to the play time, this embodiment provides a solution that only uses information such as data amount information to determine I-frames and P-frames. In a case where B-frames can be determined according to the play time, it is only necessary to determine whether the remaining frames are I-frames or P-frames. In a case where B-frames fail to be determined according to the play time (such as a case where packet header information is encrypted), all frames need to be determined, I-frames and P-frames are determined first, and the remaining frames are determined as B-frames.

In this embodiment, the data amount of a frame is used to determine the frame type by using an automatic parameter update method. Mainly the following modules are involved: I-frame determining module, P-frame determining module, parameter updating module, and type correcting module.

A. Determining I-Frames:

Generally, the I-frames in a video may be classified into the following two types: I-frames which are inserted at a fixed interval, that is, I-frames inserted according to a fixed interval in a compression process to meet random access (the interval is fixed in a certain period, and if a user switches a channel, the interval may change); and I-frames inserted adaptively, that is, I-frames inserted in positions of scenario switching to improve the compression efficiency.

For I-frames which are inserted at a fixed interval, the fixed interval may be estimated in an identification process. If no I-frame is determined when the interval expires, an easier determination condition may be set actively, or local features may be used for determination (detailed descriptions are provided hereunder).

For I-frames that are inserted adaptively, in a position of scenario switching with similar sequence space complexity, if a frame is coded as an adaptively inserted I-frame, a bit rate of the I-frame is always higher than the bit rates of earlier P-frames because the compression efficiency of the I-frame is poor. If a frame is coded as a P-frame, because of poor prediction, the bit rate of the frame is also high, and in this case, the frame is an important frame and tends to be determined as an I-frame (the data amounts of P-frames and I-frames are large, and therefore P-frames tend to be wrongly determined as I-frames). In a position of scenario switching with lowspace complexity, a frame coded as an I-frame may be smaller than an earlier P-frame, and no method is available for correctly identifying such I-frames, but the P-frames or B-frames following the I-frame may be smaller accordingly. Type correction may be performed by subsequent update to improve the identification ratio of subsequent frame types.

Therefore, I-frames may be determined through the following three steps, that is, the data amount of the current frame is compared with a given threshold respectively, and so long as the data amount of the current frame is larger than the given threshold in a step, the frame is determined as an I-frame:

determining an obvious I-frame according to threshold 1;

determining an I-frame which is inserted at a non-fixed interval according to threshold 2; and determining an I-frame which is inserted at a fixed interval that is longer than an expected fixed interval according to threshold 3.

B. Determining P-Frames:

In a case where the previous frame is an I-frame and the current video stream adopts closed-loop coding, the I-frame is not immediately followed by a B-frame. If the frame is not determined as an I-frame, the frame is a P-frame.

In a case where the previous frame is an I-frame and the current video stream adopts open-loop coding, if the data amount of the current frame is larger than threshold 4, the frame is a P-frame, or otherwise, the frame is a B-frame.

In a case where the previous frame is a P-frame and the data amount of the current frame is larger than threshold 5, or if the current GOP includes B-frames and the data amount of the current frame is larger than threshold 6, the frame is a P-frame.

If the previous frame is a B-frame and it is expressed that the current GOP includes B-frames, if the data amount of the current frame is smaller than threshold 7, the frame is a P-frame; or, in a case where it is determined that the current GOP includes P-frames and the data amount of the current frame is smaller than threshold 8, the frame is a P-frame.

C. Updating Parameters:

Counting the coding types of the GOP (open-loop or closed-loop): In the identification process, B-frames or P-frames following obvious I-frames may be counted. If most I-frames are followed by P-frames, it may be considered that a coder adopts closed-loop coding, or otherwise, it may be considered that the coder adopts open-loop coding.

Calculating an expected fixed I-frame interval: After I-frames are determined, the probability distribution of the I-frame intervals is measured, and weighted averaging is performed to obtain the expected fixed interval.

Updating the thresholds in the preceding modules in real time according to the determined frame types:

a) Threshold 1 is obtained by calculation in accordance with formula (1) according to the average data amount (av_IBPnbytes) of 50 earlier frames and the data amount of the previous I-frame:

$$\text{Threshold 1}=delta1*iframe\_size\_GOP+av\_IBPnbytes$$

where, delta1 is an adjustment factor in a value range of (0, 1), and an empirical value obtained by an experiment is 0.5.

b) Threshold 2 is obtained by calculation in accordance with formula (2) according to the data amount of the previous I-frame (iframe_size_GOP), the average data amount of largest P-frames in the current GOP (max_pframes_size_GOP), and the average data amount of I-frames and P-frames among the 50 earlier frames (av_IPnbytes):

Threshold 2=max(delta2*max_pframes_size_GOP, delta2*av_IPnbytes, delta3*iframe_size_GOP)

where, delta2 and delta3 are respectively adjustment factors, and the empirical values thereof are 1.5 and 0.5.

c) Threshold 3 is obtained by calculation in accordance with formula (3) according to the average data amount of each frame in the current GOP (av_frame_size_GOP), the data amount of the previous P-frame (prew_pframe_nbytes), and the data amount of the I-frame in the current GOP (iframe_size_GOP); or it is obtained by calculation in accordance with formula (5) according to the average data amount of P-frames in the current GOP (av_pframes_size_GOP):

Threshold 3=max(av_frame_size_GOP, ip_thresh*prew_pframe_nbytes, iframe_size_GOP/3)    Formula (3)

where, ip_thresh is calculated according to the difference between the distance from the previous I-frame to the current frame (curr_i_interval) and the expected fixed I-frame interval (expected_iframe_interval);

ip_thresh=max(2−(curr_i_interval−expected_iframe_interval)*0.1, 1.5)    Formula (4)

Threshold 3=SThresh*av_pframes_size_GOP+av_pframes_size_GOP    Formula (5)

where, sThresh is calculated according to curr_i_interval and expected_iframe_interval:

SThresh=max(delta4, SThresh/(delta5*curr_i_interval/expected_iframe_interval))    Formula (6)

where, delta4 and delta5 are respectively adjustment factors, and the empirical values thereof are 0.2 and 2.0.

d) Threshold 4 is an average of the average data amount of P-frames ((av_pframes_size_Last_GOP) and the average data amount of B-frames (av_bframes_size_Last_GOP) in a previous GOP, as shown in formula (7):

Threshold 4=(av_pframes_size_Last_GOP+av_bframes_size_Last_GOP)/2 e) Threshold 5 is 0.75 multiplied by the average data amount of P-frames in the current GOP (av_pframes_size_GOP), as shown in formula (8):

Threshold 5=delta6*av_pframes_size_GOP where, delta6 is an adjustment factor, and its empirical value is 0.75.

f) Threshold 6 is an average of the average data amount of P-frames (av_pframes_size_GOP) and the average data amount of B-frames (max_bframes_size_GOP), as shown in formula (9):

Threshold 6=(av_pframes_size_GOP+max_bframes_size_GOP)/2 g) Threshold 7 is 1.25 multiplied by the average data amount of B-frames in the current GOP (av_bframes_size_GOP), as shown in formula (10):

Threshold 7=delta7*av_bframes_size_GOP where, delta7 is an adjustment factor, and its empirical value is 1.25.

h) Threshold 8 is an average of the average data amount of P-frames (av_pframes_size_GOP) and the average data amount of B-frames (av_bframes_size_GOP), as shown in formula (11):

Threshold7=(av_pframes_size_GOP+av_bframes_size_GOP)/2

D. Correcting Types:

Correcting Undetermined I-Frames:

After the preceding steps, it is possible that no I-frame is determined after an interval far longer than the expected fixed interval. In this case, although the frame types are already output, local information may be used to correct parameters so that the subsequent frame types can be determined more accurately. In a position close to the expected fixed interval, a frame with the largest data amount is obtained, its frame type is changed to an I-frame, and parameters such as the average data amounts of various frames in the GOP and the I-frame interval are updated.

Correcting Wrongly Determined B-Frames:

In actual applications, a video coder generally considers a decoding delay and a decoding storage overhead when using B-frames to improve coding efficiency, and does not code more than 7 consecutive B-frames, and even more extremely, does not code more than 3 consecutive B-frames. A predicted value of the maximum number of consecutive B-frames is obtained by counting the previously determined frame types. When a frame is determined as a B-frame, it is necessary to ensure that the number of consecutive B-frames does not exceed the predicted value. If the value is exceeded, it is indicates that a frame among the determined consecutive B-frames may be wrongly determined. In this case, it is necessary to redetermine a frame with the largest data amount among these frames as a P-frame, and update information such as the average data amounts of various frames in the GOP.

3. Detecting the Types of Frames when the Boundaries and Data Amounts of the Frames Fail to be Determined:

A prerequisite for the preceding two embodiments is that the boundaries and data amounts of the frames are already obtained. If no packet loss occurs, the boundary and data amount of each frame may be accurately obtained by using the RTP sequence number, the timestamp, and the flag (in the ISMA mode), or by using the RTP sequence number, and the CC, PUSI, and PID in a TS (in the TS over RTP mode). However, in the case of packet loss, if packet loss occurs at a frame boundary, it is impossible to accurately determine the position of the frame boundary, and the number of packets in a frame may be wrongly estimated, or even the data amounts of two frames are wrongly counted into one frame. This causes great interference to the detection of the frame type. Therefore, if packet loss occurs, packet loss processing is needed before the frame type is determined, so that information such as the frame boundary, the frame data amount, and the frame type is obtained.

Because the change of the RTP timestamp in the ISMA mode indicates arrival of a new frame, the processing procedure is simple when packet loss occurs.

1) If the timestamp before and after packet loss does not change, it indicates that the lost packet is a packet inside a frame. In this case, only the data of the lost packet needs to be considered when the data amount of the frame is counted.

2) If the timestamp before and after packet loss changes, it indicates that packet loss occurs at the boundary of a frame. In this case, if the flag of a packet previous to the lost packet is 1, the lost packet is deemed as the data of a next frame, and the data amount of the lost packet is added to the data amount of the next frame, or otherwise, the data amount of the lost packet is evenly allocated to the previous frame and the next frame (herein, it is assumed that the length of a lost packet in burst packet loss does not exceed the length of one frame).

Figure 3:
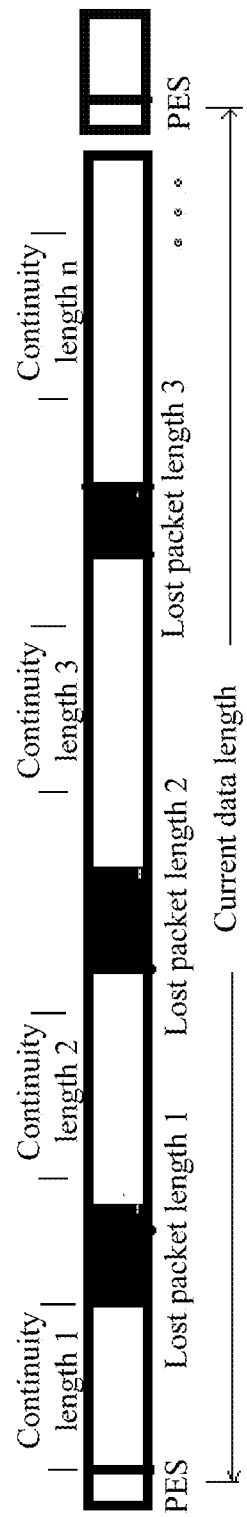
FIG. 3 is a schematic structural diagram of a frame with packet loss according to an embodiment of the present invention.

The case of TS over RTP is relatively complex. Because the start of a frame can only be determined according to presence of a PES packet header (that is, the PUSI is 1), if packet loss occurs, it is difficult to determine whether the data between two packets having PES packet headers belongs to one frame or multiple frames. As shown in FIG. 3, with respect to the data between the two packets having the PES packet headers, packet loss occurs three times, but it is impossible to determine whether the data belongs to the same frame because it is impossible to know whether any lost packet also has the PES packet header (which represents the start of a frame). The embodiment provides solutions from two aspects.

If the PES packet header is decodable, the PTS therein may be used to determine whether the current data length (that is, the data length between the two packets having the PES packet headers) includes frame header information.

1) The sequence of PTSs correctly detected in the GOP is measured, and the distribution probability and distance from the current frame are weighted and used as an expected index to obtain an expected coding structure.

2) According to a receiving sequence, the PTSs in a series of frames starting from an I-frame, to the current PTS, and then to the next PTS, are matched with the expected coding structure.

a) If a PTS complies with the expected coding structure, it is considered that no lost packet of the data length includes the frame header information. That is, the current data length belongs to one frame, packet loss occurs inside the frame, and no division is required.

b) If a PTS does not comply with the expected coding structure, it indicates that a lost packet probably includes the frame header information. In this case, the current data length is divided in accordance with the expected coding structure and the position of the lost packet (continuity length and lost packet length), and the frame type, frame_size, and PTS are allocated properly.

3) If a frame previously determined to have lost a frame header is detected later, the previous determination result is updated in a correction step.

In addition, whether the current data length belongs to one frame and which frame type the data is of may be determined according to the lost packet length, the continuity length, maximum continuity length and maximum lost packet length.

1) If the data length is nearly the same as the length of the previous I-frame, it is considered that the data length belongs to the same I-frame. If the data length is nearly the same as the length of a P-frame and the maximum continuity length is larger than the average data amount of B-frames within 50 frames, it is considered that the data length belongs to the same P-frame. In other cases, the process goes to 2).

2) If the data length is nearly the same as the length of two P-frames, the data length is divided into two P-frames. The data length is divided into two segments, with the length of either segment being closest to the length of a P-frame, and it must be ensured that the second segment starts with a lost packet. In other cases, the process goes to 3).

3) If the data length is nearly the same as the length of one P-frame plus the length of one B-frame, the data length is divided into a P-frame and a B-frame. A packet having the largest continuity length belongs to the P-frame. On this basis, the data length is divided into two segments, with the length of either segment being close to the length of a P-frame and the length of a B-frame respectively, and it must be ensured that the second segment starts with a lost packet. In other cases, the process goes to 4).

4) If the largest continuity length is smaller than the length of a B-frame and the data length is nearly the same as the length of three B-frames, the data length is divided into three B-frames. The data length is divided into three segments, with the length of each segment being close to the length of a B-frame, and it must be ensured that the second segment and the third segment start with a lost packet. In other cases, the process goes to 5).

5) If the largest continuity length is smaller than the length of a B-frame and the data length is nearly the same as the length of two B-frames, the data length is divided into two B-frames. The packet of the data length is divided into two segments, with the length of either segment being close to the length of a B-frame, and it must be ensured that the second segment and the third segment start with a lost packet. In other cases, the process goes to 6).

6) In other cases, it is considered that the entire data length belongs to one frame.

Figure 4:
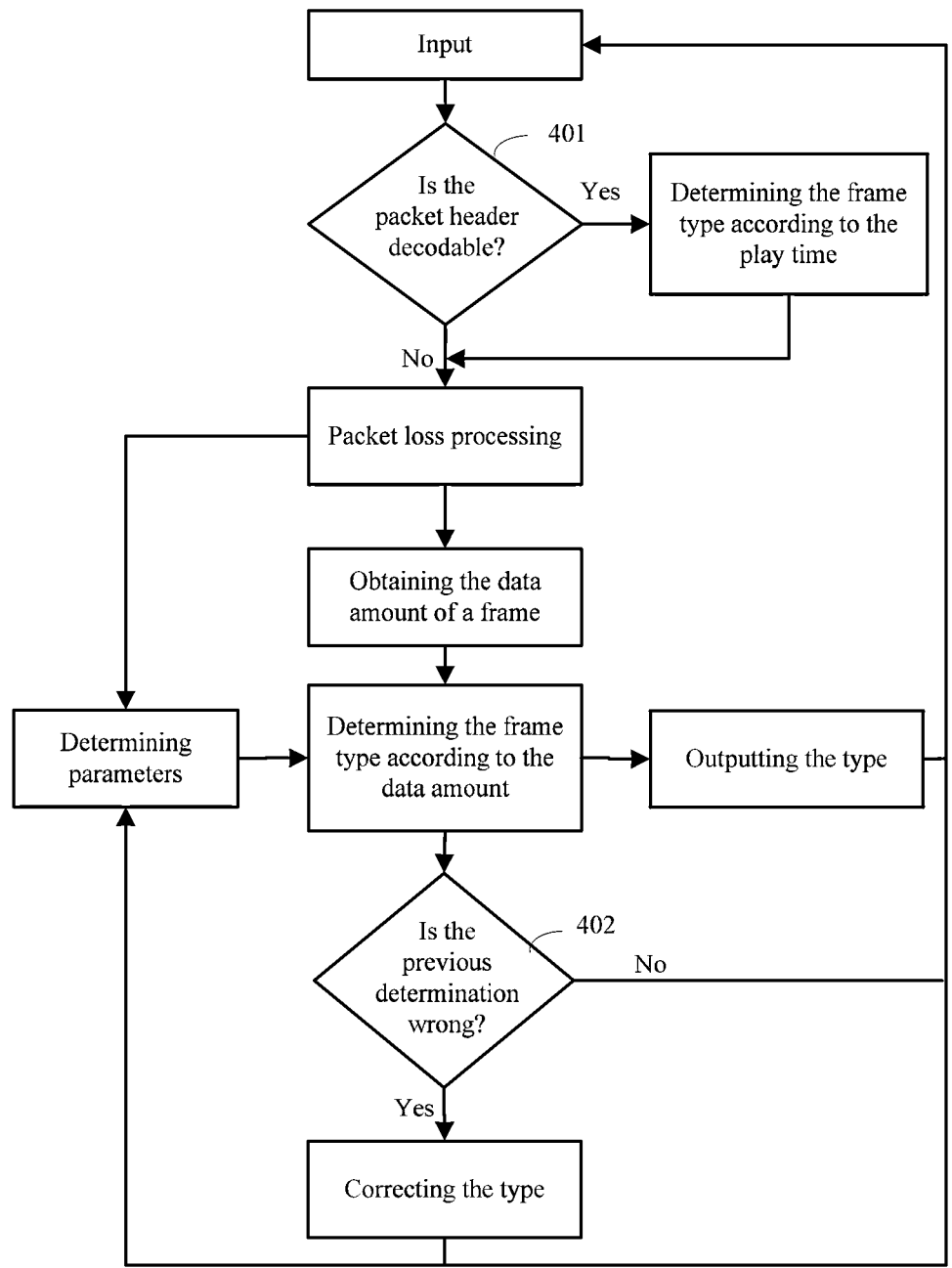
FIG. 4 is a schematic flowchart of a method according to an embodiment of the present invention.

In combination with the above embodiments, this embodiment provides an optional solution for detecting frame types. The specific process is shown in FIG. 4, including the following stages: A PTS is used to preliminarily determine a frame type and perform packet loss processing. The data amount is further used to determine and correct the frame type.

401. After the data is input, determine whether the packet header is decodable. If the packet header is decodable, determine the frame type according to the play time. If the packet header is not decodable, perform the packet loss processing.

402. After the frame type determination ends, determine whether the previous frame type determination is wrong. If the previous frame type determination is wrong, correct the frame type; otherwise, go to a cycle of determining the frame type, that is, go to 401. The specific execution is as follows:

Determining the frame type according to the play time: For an input stream, first determine whether the input stream is a TS over RTP packet. If so, determine whether the PES packet header of the TS packet is encrypted. For an RTP packet or a TS over RTP packet with a decodable PES packet header, the play time information may be used to preliminarily determine whether the frame is a B-frame. For specific implementation, reference may be made to the first key point.

Packet loss processing: Detect whether any packet is lost. If no packet is lost, directly count the data amount and go to the following step of determining the frame type. If any packet is lost, it is necessary to perform packet loss processing with respect to an RTP packet or a TS over RTP packet respectively, and estimate the frame boundary, the frame data amount, or some frame types. For specific implementation, reference may be made to the third key point.

Determining the frame type according to the data amount: In this process, the frame type is determined in real time, and related parameters are adjusted dynamically and intelligently. For specific implementation, reference may be made to the second key point.

Correcting the type: Correction may be performed if it is found in a determination process that the previous determination result is wrong. This process does not affect an output result, but may be used to update the related parameters to improve the accuracy of later determination. For specific implementation, reference may be made to the second key point.

Figure 5:
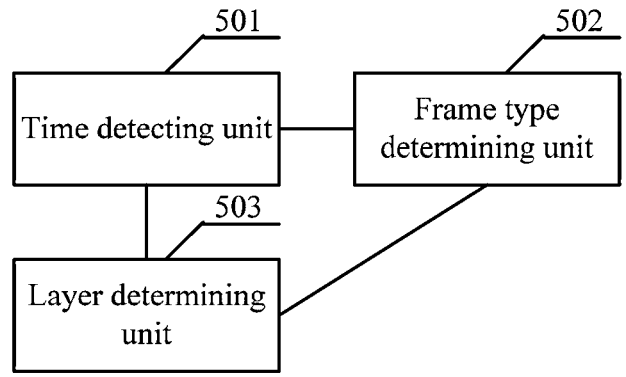
FIG. 5 is a schematic structural diagram of an apparatus according to an embodiment of the present invention.

As shown in FIG. 5, an embodiment of the present invention further provides an apparatus for detecting frame types, including:

a time detecting unit 501, configured to detect play time of each frame; and a frame type determining unit 502, configured to determine a current frame as a bi-directional predicted frame, B-frame, if the play time of the current frame is less than the maximum play time of received frames.

Further, the apparatus in FIG. 5 may further include:

a layer determining unit 503, configured to determine, according to a play sequence and coding sequence of each frame, a layer to which the B-frame belongs in hierarchical coding. It should be noted that layer determining is not a necessary technical feature of the embodiment of the present invention for determining a B-frame. The technical feature is required only when related processing of layer information is needed subsequently.

Figure 6:
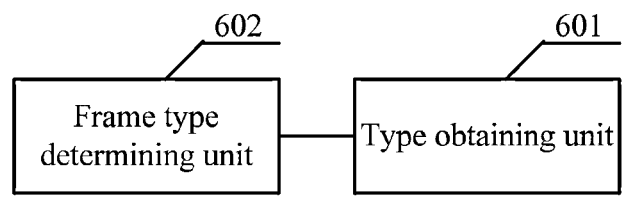
FIG. 6 is a schematic structural diagram of an apparatus according to an embodiment of the present invention.

As shown in FIG. 6, an embodiment of the present invention further provides another apparatus for detecting frame types, including:

a type obtaining unit 601, configured to obtain a coding type of a bitstream including received frames, where the coding type includes open-loop coding and closed-loop coding; and a frame type determining unit 602, configured to: if a data amount of a current frame is larger than a first threshold, determine the current frame as an obvious I-frame, where the first threshold is obtained by calculation according to an average data amount of a specified number of consecutive frames and the data amount of the I-frame;

if a frame previous to the current frame is an I-frame and the coding type is closed-loop coding and the current frame is a non-obvious I-frame, or if a frame previous to the current frame is an I-frame and the coding type is open-loop coding and the data amount of the current frame is larger than a fourth threshold, determine the current frame as a P-frame, where the fourth threshold is an average of an average data amount of P-frames and an average data amount of B-frames in a group of pictures; and if the current frame is neither an I-frame nor a P-frame, determine the current frame as a B-frame.

Further, the frame type determining unit 602 is further configured to: if the data amount of the current frame is larger than a second threshold, determine the current frame as an I-frame, where the second threshold is a maximum one of a data amount of an I-frame previous to the current frame, the average data amount of P-frames in the group of pictures including the current frame, and the average data amount of the specified number of consecutive frames.

Further, the frame type determining unit 602 is further configured to: if an interval between the current frame and a previous I-frame is longer than a fixed interval and the data amount of the current frame is larger than a third threshold, determine the current frame as an I-frame, where the third threshold is obtained by calculation according to an average data amount of frames in the group of pictures including the current frame, the data amount of a P-frame previous to the current frame, the data amount of the I-frame in the group of pictures including the current frame, and a difference between the distance from the previous I-frame to the current frame and an expected fixed I-frame interval, or the third threshold is obtained by calculation according to the average data amount of frames in the group of pictures including the current frame and the difference between the distance from the previous I-frame to the current frame and the expected fixed I-frame interval.

Further, the frame type determining unit 602 is further configured to: if the frame previous to the current frame is a P-frame and the data amount of the current frame is larger than a fifth threshold, or if the group of pictures comprising the current frame includes B-frames and the data amount of the current frame is larger than a sixth threshold, determine the current frame as a P-frame, where the fifth threshold is a product of a first adjustment factor and the average data amount of P-frames in the group of pictures including the current frame, where the first adjustment factor is larger than 0.5 and smaller than 1, and the sixth threshold is the average of the average data amount of P-frames and the average data amount of B-frames; and if the frame previous to the current frame is a B-frame and the data amount of the current frame is smaller than a seventh threshold, or if the group of pictures comprising the current frame includes P-frames and the data amount of the current frame is smaller than an eighth threshold, determine the current frame as a P-frame, where the seventh threshold is a product of a second adjustment factor and the average data amount of B-frames in the group of pictures including the current frame, where the second adjustment factor is larger than 1 and smaller than 1.5, and the eighth threshold is the average of the average data amount of P-frames and the average data amount of B-frames.

Figure 7:
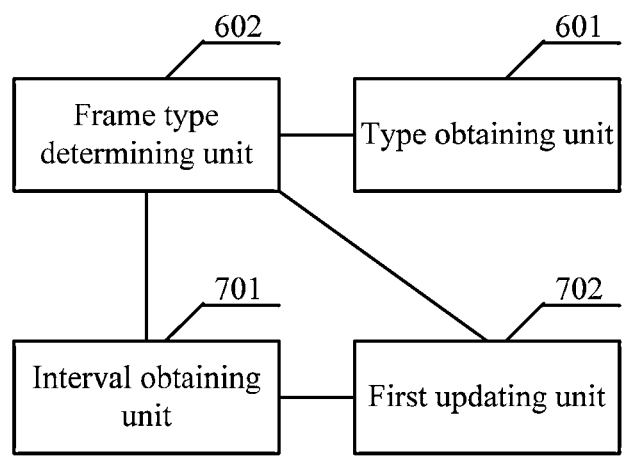
FIG. 7 is a schematic structural diagram of an apparatus according to an embodiment of the present invention.

Further, as shown in FIG. 7, the apparatus further includes:

an interval obtaining unit 701, configured to determine the fixed I-frame interval after frame type determination ends;

the frame type determining unit 602, further configured to determine a frame having a maximum data amount in a specified range in the fixed interval as an I-frame after the fixed interval expires, if it is still determined that no I-frame exists; and a first updating unit 702, configured to update average data amounts of various frames in the group of pictures and an I-frame interval parameter.

Figure 8:
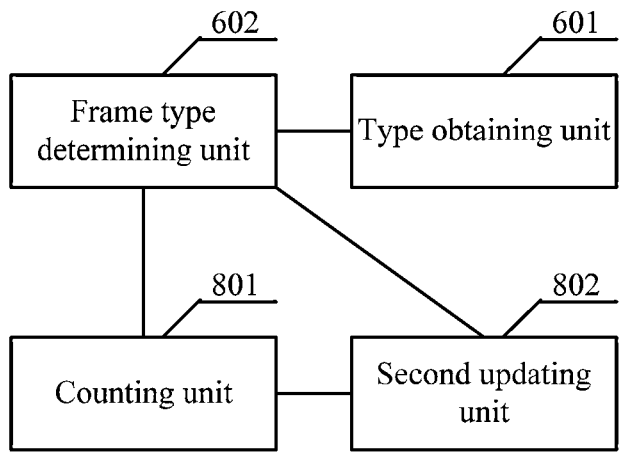
FIG. 8 is a schematic structural diagram of an apparatus according to an embodiment of the present invention.

Further, as shown in FIG. 8, the apparatus further includes:

a counting unit 801, configured to count consecutive B-frames after frame type determination ends;

the frame type determining unit 602, further configured to determine a frame having a maximum data amount among the consecutive B-frames as a P-frame if the number of consecutive B-frames is larger than a predicted value, where the predicted value is larger than or equal to 3 and smaller than or equal to 7; and a second updating unit 802, configured to update the average data amounts of various frames in the group of pictures.

Figure 9:
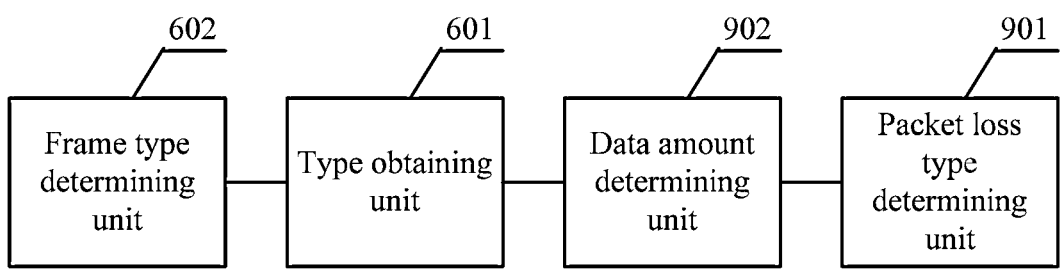
FIG. 9 is a schematic structural diagram of an apparatus according to an embodiment of the present invention.

Further, as shown in FIG. 9, the apparatus further includes:

a packet loss type determining unit 901, configured to determine whether any packet of a received frame is lost, and if packet loss occurs, determine a packet loss type; and a data amount determining unit 902, configured to: if the packet loss type is packet loss occurred in intra frame, when calculating the data amount of the frame, determine a sum of the data amount of the received frame and the data amount of the lost packet as the data amount of the frame; and if the packet loss type is packet loss occurred in inter frame, determine whether a flag of a packet previous to the lost packet is 1, and if so, count the data amount of the lost packet into a next frame, or otherwise, evenly allocate the data amount of the lost packet to the previous frame and the next frame.

It should be noted that the apparatus of this embodiment and the apparatus in FIG. 5 or 6 may be combined for usage and that the frame type determining unit 502 and the frame type determining unit 602 may be implemented by using a same functional unit.

The embodiment of the present invention fully uses RTP or TS over RTP packet header information in combination with the coding sequence of various frames in a video and comparison between data amounts of various frames received earlier and later to quickly determine the frame types in real time without decoding a payload of the video, and improves the accuracy of the detected frame types by means of packet loss processing, automatic parameter update, and later frame type correction.

In a video stream, there is packet header information indicating the play time of video data, such as, an RTP timestamp in a ISMA mode and a PTS of a PES packet header in a TS over RTP mode. The embodiment of the present invention uses the relationship between the play time information and the coding sequence to determine the coding types of some special structures, such as, B-frames. However, in the TS over RTP mode, it is possible that a TS payload is completely encrypted and that a PES packet header cannot be decoded, that is, no PTS is available. Therefore, an embodiment of the present invention further provides a solution that uses information such as data amount information other than the play time to determine frame types.

By observing video streams in actual applications, obvious differences may be found between different types of frames in a same GOP. To be specific, an I-frame has a largest data amount, a P-frame has a moderate data amount, and a B-frame has the smallest data amount. If the I-frame in the start position of each GOP can be identified correctly, the data amount of the frame may be used to determine the P-frames and B-frames in the GOP. However, due to instability of video signals, the data amounts of I-frames in different positions vary greatly, and are even equal to the data amounts of P-frames in earlier GOPs. This makes it difficult to determine I-frames. In an embodiment of the present invention, a set of intelligently adjustable dynamic parameters is designed to improve the robustness and accuracy of determining the frame types. In particular, in the process of determining I-frames, determination rules and related parameters are appropriately adjusted by fully considering features of I-frames in different application scenarios, so that the ratio of wrongly determined I-frames is greatly reduced.

In an application scenario of lossy transmission, packet loss may occur in an input video stream. Packet loss may be classified into two types according to its impact on a determination process: 1. packet loss occurred in intra frame; 2. packet loss at a frame boundary. In the case of packet loss occurred in intra frame, because information of the frame boundary is not lost, the frame boundary may be first obtained, and then the corresponding sequence numbers may be used to count the number of packets in one frame. In the case of packet loss at the frame boundary (for example, a packet whose flag is 1 in RTP, or a packet whose PUSI is set to 1 in TS over RTP), the boundary between two adjacent frames may fail to be determined, or the data of two adjacent frames may be counted into one frame, so that the calculated data amount of the frame is incorrect, which affects the result of determining the frame type. The embodiment of the present invention discusses packet loss detection, frame boundary estimation, and estimation of some frame types.

At the early stage of determining the frame types, because of insufficient measurement data, many frames may be wrongly determined, which not only affects an existing output result, but also affects the accuracy of later determination by changing various parameters. In the embodiment of the present invention, frame type correction is added after the process of determining the frame types. After data is increased, if an obvious error exists in the output result, internal correction is performed. Although the internal correction cannot change the frame type already output, the accuracy of later determination may be improved by adjusting parameters.

The following describes several applications after the determination of the frame types. It is understandable that the application examples after the determination of the frame types shall not be understood as exhaustive and shall not constitute any limitation on the embodiments of the present invention.

1. Providing differential protection according to the determined frame types: If bandwidth is limited, differential protection may be provided according to different impacts of various frames on the video quality, so that the video receiving quality reaches the optimum.

2. Using an expected period in combination with the average bit rate of a GOP to implement quick browsing of a video: With respect to locally stored streams, if a user does not want to browse all videos, quick preprocessing may be performed to extract a position corresponding to an I-frame and thereby implementing quick browsing. With respect to the streams stored on a server, if a user does not want to browse all videos, the server may perform quick preprocessing to extract a position corresponding to an I-frame and thereby selectively transmitting key frame information to the user.

3. Quality of service (Quality of Service, QoS): If bandwidth is insufficient, a part of B-frames or P-frames (P-frames near the end of a GOP) may be discarded intelligently at an intermediate node according to the determined frame types, so that the impact on video quality is minimized when a bit rate is reduced.

In addition, based on an experiment, the effects of the technical solutions of the embodiments of the present invention are tested, and the test results are as follows:

In the experiment in this section, in the case of no packet loss, the cases where the play time is used and the play time is not used are respectively compared with the second solution of the prior art. The results are shown in Table 1.

TABLE 1

| Test sequences | | | |
|---|---|---|---|
| Sequence | Sequence | Sequence Length | Total Number of I-Frames |
| Capture on Live Network | iptv137_jiami.csv | 15861 | 675 |
| | iptv138_jiami.csv | 17320 | 733 |
| | iptv139_jiami.csv | 14063 | 622 |
| | nbafromhms.csv | 1141 | 72 |
| | song.csv | 38741 | 1677 |
| | 20001_001_FITA_4m_1280×720p.txt | 9517 | 536 |
| | 20003_031_sports_6m_1920×1080p.csv | 2660 | 116 |
| | after_50m.csv | 1401 | 42 |
| | crazy_stone.csv | 383 | 17 |

TABLE 1-continued

Test sequences

| Sequence | Sequence | Sequence Length | Total Number of I-Frames |
|---|---|---|---|
| Coding at Fixed Rates | Bee_Flower_1500~15000.csv (9↑) | 300 | 11 |
| | Coral_Fish_1500~15000.csv(9↑) | 298 | 10 |
| | Dolphin_Jumping_1500~15000.csv(9↑) | 300 | 12 |
| | Fishingman_RunningTrain_1500~15000.csv(9↑) | 271 | 10 |
| | Flower_Insect_1500~15000.csv(9↑) | 250 | 11 |
| | Openning_1500~15000.csv(9↑) | 240 | 12 |
| | Speaking_Woman_1500~15000.csv(9↑) | 300 | 10 |
| | Xman_1500~15000.csv(9↑) | 209 | 12 |

Test sequences: TS streams captured on a live network and streams coded at fixed bit rates are tested, as shown in Table 1. Among the streams captured on the live network, the first three streams (iptv137, iptv138, and iptv139) are the streams with the payload part encrypted and the PES packet header not encrypted. The bit rates of the streams coded at the fixed bit rates are (1500, 3000, 4000, 5000, 6000, 7000, 9000, 12000, and 15000). The selected streams all adopt H.264 coding, and their frame types are I-frame, P-frame, and B-frame, without hierarchical B-frame. Table 2 shows the experiment results of detecting frame types of the preceding sequences.

TABLE 2

Comparison of detection results between the method of the present invention and the method of the prior art

| | Stream Source | | Ratio of Undetected I-Frames | Ratio of Wrongly Detected I-Frames | P->I Error Ratio | P->B Error Ratio | B->P Error Ratio | Total Error Ratio |
|---|---|---|---|---|---|---|---|---|
| Using PTS | Detection Result of Captured Stream | Method of Prior Art | 29.03% | 7.09% | 0.73% | 0.00% | 0.01% | 1.65% |
| | | Method of Present Invention | 15.19% | 11.81% | 1.40% | 0.00% | 0.01% | 1.20% |
| | Detection Result of Self-Coded Stream | Method of Prior Art | 10.67% | 63.16% | 7.62% | 0.00% | 0.00% | 3.08% |
| | | Method of Present Invention | 10.77% | 16.24% | 2.08% | 0.00% | 0.00% | 1.19% |
| Not Using PTS | Detection Result of Captured Stream | Method of Prior Art | 29.03% | 7.13% | 0.73% | 9.57% | 4.51% | 9.47% |
| | | Method of Present Invention | 15.12% | 11.49% | 1.40% | 8.28% | 4.14% | 8.47% |
| | Detection Result of Self-Coded Stream | Method of Prior Art | 10.67% | 64.90% | 7.62% | 6.15% | 3.35% | 7.31% |
| | | Method of Present Invention | 11.93% | 15.43% | 1.96% | 6.39% | 1.75% | 4.44% |

As shown in Table 2, the following factors are compared during the experiment: The ratio of undetected I-frames is a ratio of undetected I-frames to the total number of I-frames in a sequence. The ratio of wrongly detected I-frames is the ratio of the number of P-frames or B-frames wrongly determined as I-frames to the total number of I-frames (it should be noted that, in most cases, only P-frames are wrongly determined as I-frames; B-frames are wrongly determined as I-frames in few cases, which is consistent with the fact that the bit rate of B-frames is far lower than the bit rate of I-frames). The P->I error ratio is the ratio of the number of P-frames wrongly determined as I-frames to the actual total number of P-frames. The P->B error ratio is the ratio of the number of P-frames wrongly determined as B-frames to the actual total number of P-frames. The B->P error ratio is the ratio of the number of B-frames wrongly determined as P-frames to the actual total number of B-frames. The total error ratio is the ratio of the number of wrongly determined frames to the total number of frames (so long as a determined frame type is inconsistent with an actual type, the frame type is considered as wrongly determined). The average of the ratio of undetected I-frames and the ratio of wrongly detected I-frames may reflect the probability of correctly detected I-frames.

When the PTS is used to determine B-frames, the accuracy is 100%. Therefore, the results of a test using the play time and the results of a test not using the play time are not compared individually herein. Meanwhile, to fully reflect advantages of the second embodiment of the present invention, when the play time is used, the process of determining B-frames by using the play time is also added to the method of the prior art. Therefore, performance differences mainly come from differences of the determining methods using frame data amounts. The results show that in cases where the play time may be used to determine the frame types and the play time is not used to determine the frame types, the method of the present invention is superior to the method of the prior art in detecting the streams captured on the live network and the self-coded streams, and especially, when detecting the self-coded streams, the method of the present invention has a more obvious detection effect, and even in some cases, no error occurs, while the method of the prior art is hardly capable of determining frames without errors.

FIG. 10 to FIG. 15 provide detailed detection results of some sequences. In the figures, an actual line is marked with a circle, and a predicted line is marked with a triangle; the distribution of I-frames (a horizontal axis indicates an I-frame interval; when the interval is 1, it indicates that two adjacent frames are I-frames; when the interval is 0, it indicates that the I-frame interval is larger than 49 frames; the predicted I-frame period is the I-frame period predicted by the method of the present invention; and the actual I-frame period is the actual period of an I-frame) and the distribution of frame types are included (in the tables corresponding to the figures, a diagonal line of a matrix indicates the number of correctly determined frames, and other positions indicate the number of wrongly determined frames). The title of each figure is sequence name+total number of frames+total error ratio. As can be seen, the sequences on the live network generally have a fixed I-frame interval (the maximum value in the figures), and with the switching of scenarios, some I-frames are inserted adaptively, which causes a jitter near the maximum value and forms the distribution of I-frames in the figures. For a FIFA sequence (FIG. 14), it can be seen that two maximum values exist in an actual period. A algorithm of the present invention can also accurately distinguish the two maximum values. The expected I-frame interval estimated according to the algorithm of the present invention is approximate to the actual I-frame interval and therefore may be used to guide frame skipping in quick browsing.

Figure 10:
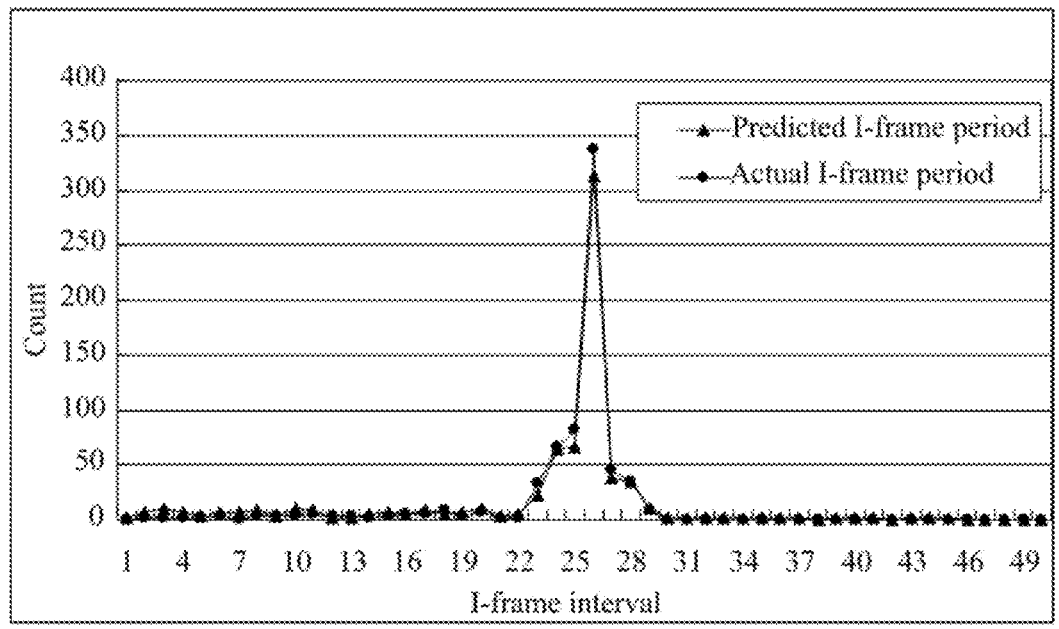
FIG. 10 is a schematic diagram illustrating detection results according to an embodiment of the present invention.

FIG. 10: the result of iptv137 15861 (error 0.6%) is shown in Table 3.

TABLE 3

| iptv 137 | Detected as P | Detected as B | Detected as I |
| --- | --- | --- | --- |
| Actual Type P | 4909 | 0 | 61 |
| Actual Type B | 1 | 10215 | 0 |
| Actual Type I | 36 | 0 | 639 |

Figure 11:
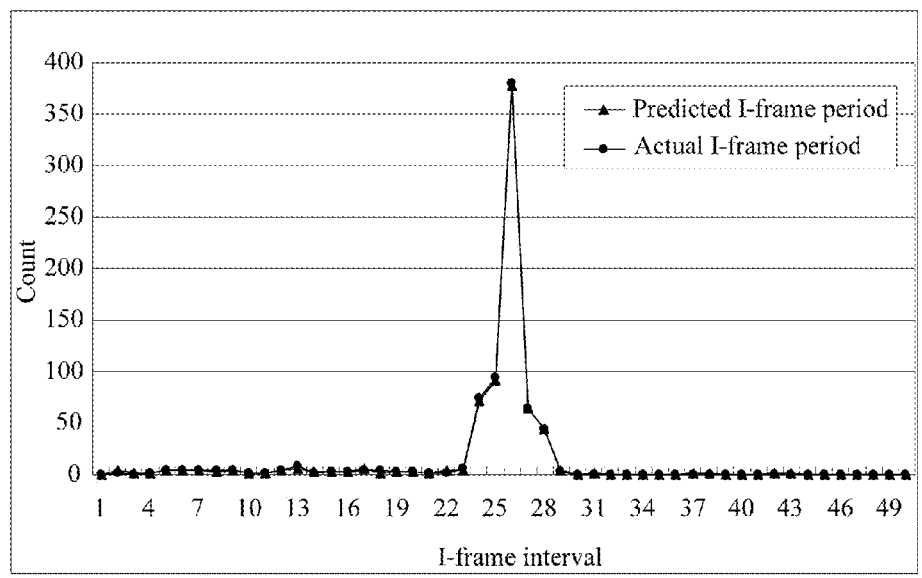
FIG. 11 is a schematic diagram illustrating detection results according to an embodiment of the present invention.

FIG. 11: the result of iptv138 17320 (error 0.1%) is shown in Table 4.

TABLE 4

| iptv 138 | Detected as P | Detected as B | Detected as I |
| --- | --- | --- | --- |
| Actual Type P | 5676 | 0 | 8 |
| Actual Type B | 0 | 10903 | 0 |
| Actual Type I | 10 | 0 | 723 |

Figure 12:
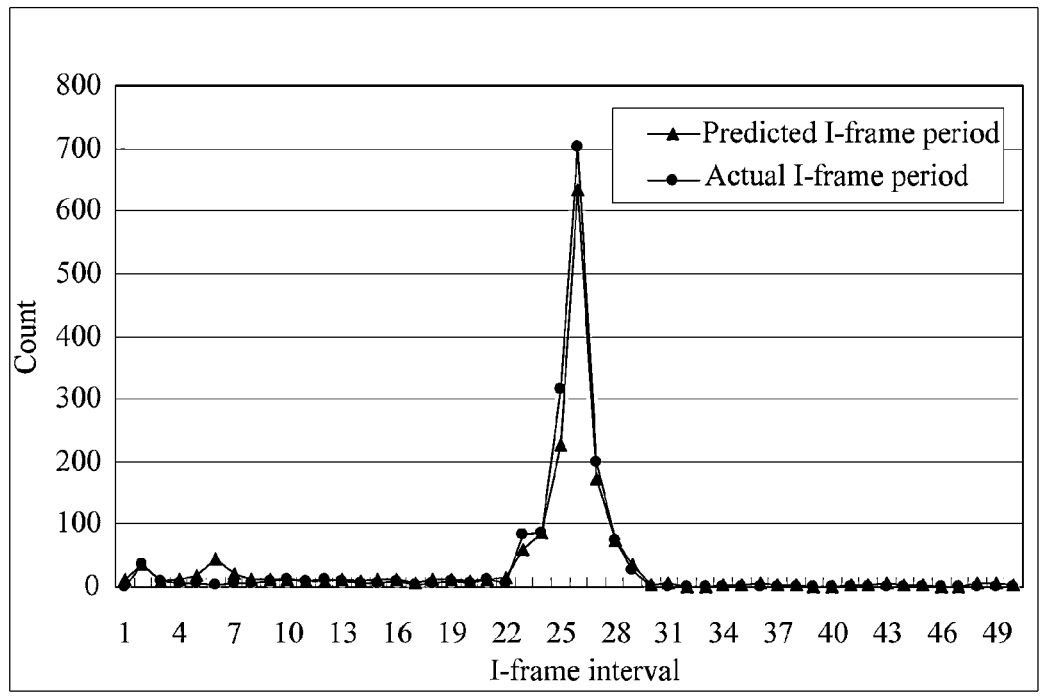
FIG. 12 is a schematic diagram illustrating detection results according to an embodiment of the present invention.

FIG. 12: shows the result of song 38741 (error 0.9%) is shown in Table 5.

TABLE 5

| song | Detected as P | Detected as B | Detected as I |
| --- | --- | --- | --- |
| Actual Type P | 16698 | 0 | 149 |
| Actual Type B | 0 | 20217 | 0 |
| Actual Type I | 210 | 0 | 1467 |

Figure 13:
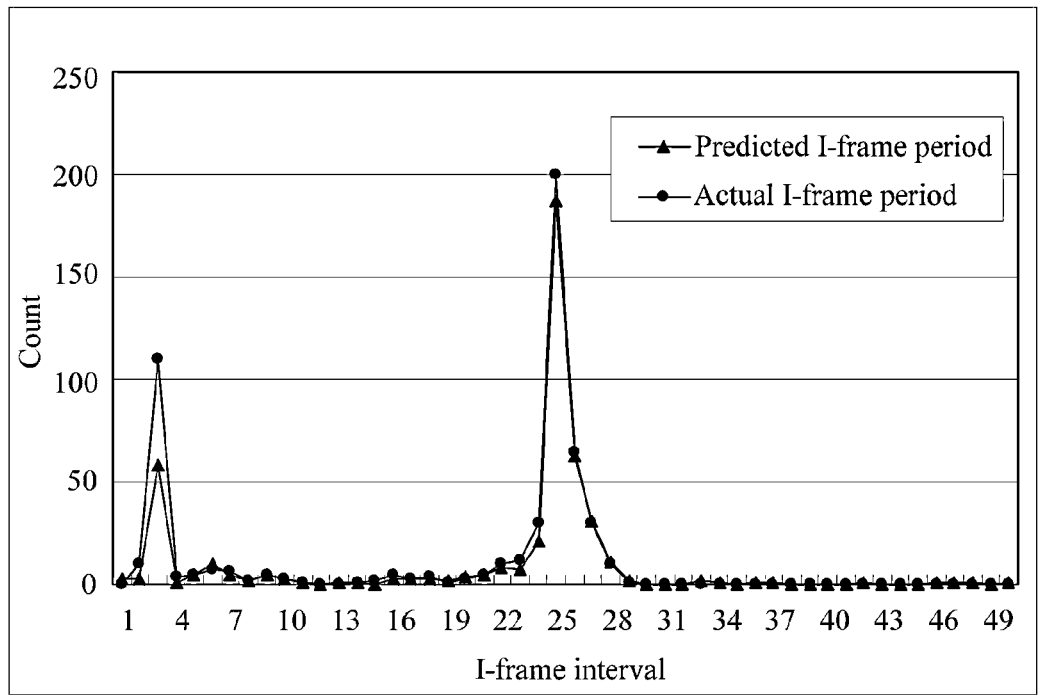
FIG. 13 is a schematic diagram illustrating detection results according to an embodiment of the present invention.

FIG. 13: the result of FIFA 9517 (error 1.3%) is shown in Table 6.

TABLE 6

| FIFA | Detected as P | Detected as B | Detected as I |
| --- | --- | --- | --- |
| Actual Type P | 4267 | 0 | 21 |
| Actual Type B | 0 | 4693 | 0 |
| Actual Type I | 106 | 0 | 430 |

Figure 14:
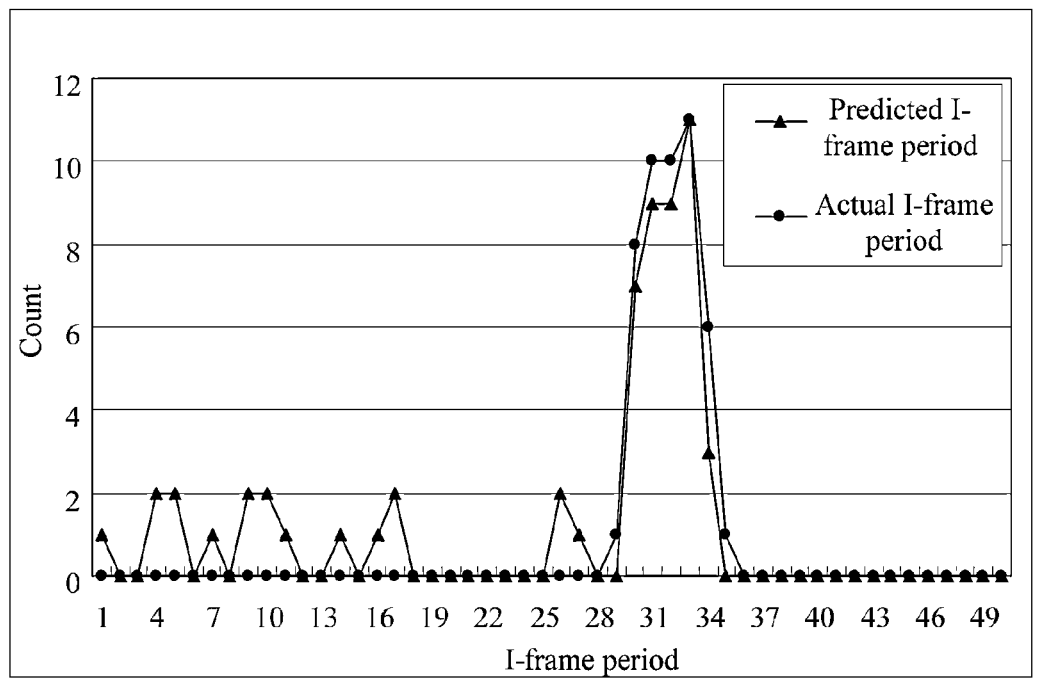
FIG. 14 is a schematic diagram illustrating detection results according to an embodiment of the present invention.

FIG. 14: the result of travel 1486 (error 0.8%) is shown in Table 7.

TABLE 7

| travel | Detected as P | Detected as B | Detected as I |
| --- | --- | --- | --- |
| Actual Type P | 493 | 0 | 11 |
| Actual Type B | 0 | 934 | 0 |
| Actual Type I | 1 | 0 | 47 |

Figure 15:
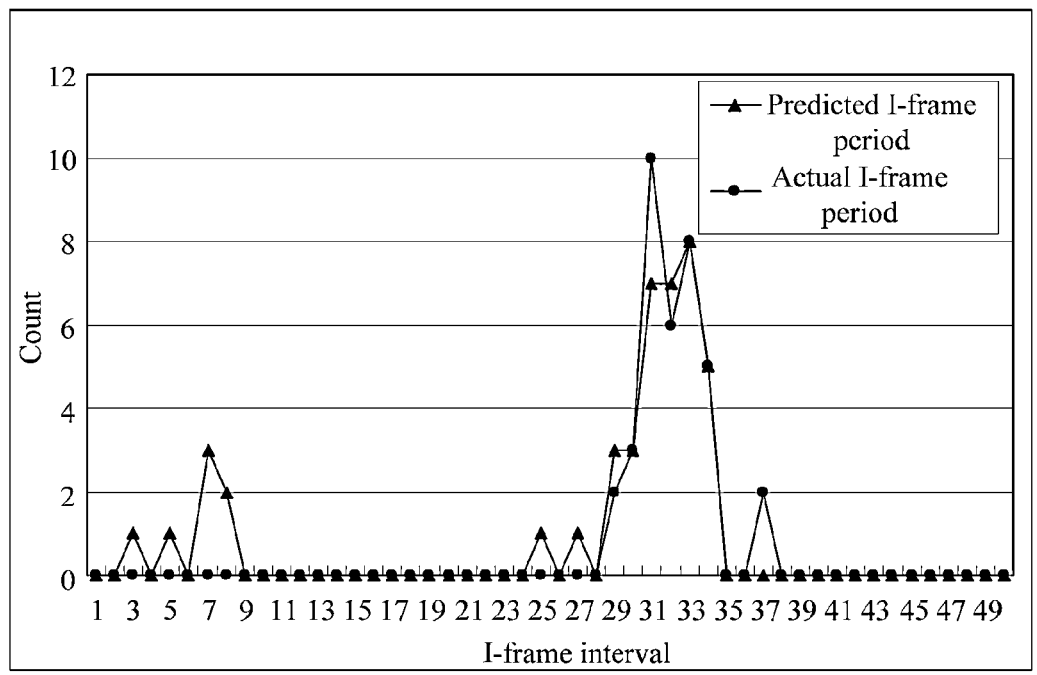
FIG. 15 is a schematic diagram illustrating detection results according to an embodiment of the present invention.

FIG. 15: the result of sport 1156 (error 0.3%) is shown in Table 8.

TABLE 8

| sport | Detected as P | Detected as B | Detected as I |
| --- | --- | --- | --- |
| Actual Type P | 396 | 0 | 4 |
| Actual Type B | 0 | 719 | 0 |
| Actual Type I | 0 | 0 | 37 |

Persons of ordinary skill in the art may understand that all or part of the steps of the methods in the embodiments may be implemented by a program instructing relevant hardware. The program may be stored in a computer readable storage medium. The storage medium may be a read-only memory, a magnetic disk, an optical disk, and the like.

A method and an apparatus for detecting frame types provided by the embodiments of the present invention are described in detail above. Although the principle and implementation mode of the present invention are described with reference to specific embodiments in the present invention, descriptions of the embodiments are only intended to help understand the method and core idea of the present invention. Meanwhile, with respect to the specific implementation and applicability of the present invention, modifications and variations may be made by persons of ordinary skill in the art according to the idea of the present invention. Therefore, the content of the specification shall not be construed as a limitation on the present invention.

What is claimed is:

1. A method for detecting frame types, comprising:
    obtaining a coding type of a bitstream comprising the received frames, wherein the coding type comprises open-loop coding and closed-loop coding;
    if a data amount of the current frame is larger than a first threshold, determining the current frame as an obvious intra coded frame (I-frame), wherein the first threshold is obtained by calculation according to an average data amount of a specified number of consecutive frames and a data amount of an I-frame;
    if the data amount of the current frame is larger than a second threshold, determining the current frame as an I-frame, wherein the second threshold is a maximum of the data amount of an I-frame previous to the current frame, the average data amount of predicted frames (P-frames) in the group of pictures comprising the current frame, and the average data amount of the specified number of consecutive frames,
    if a frame previous to the current frame is an I-frame and the coding type is closed-loop coding and the current frame is a non-obvious I-frame, or if the frame previous to the current frame is an I-frame and the coding type is open-loop coding and the data amount of the current frame is larger than a fourth threshold, determining the current frame as a unidirectional predicted frame (P-frame), wherein the fourth threshold is an average of an average data amount of the P-frames and an average data amount of bi-directional predicted frames (B-frames) in a group of pictures; and if the current frame is neither an I-frame nor a P-frame, determining the current frame as a B-frame.

2. The method according to claim 1, wherein the obtaining a coding type of a bitstream comprising the received frames comprises:
counting the type of a frame next to an obvious I-frame, and if a ratio of P-frames reaches a specified ratio, determining that the coding type is closed-loop coding; if the ratio of the P-frames does not reach the specified ratio, determining that the coding type is open-loop coding.

3. The method according to claim 1, further comprising:
if an interval between the current frame and a previous I-frame is longer than a fixed interval and the data amount of the current frame is larger than a third threshold, determining the current frame as an I-frame, wherein the third threshold is obtained by calculation according to an average data amount of frames in the group of pictures comprising the current frame, the data amount of a P-frame previous to the current frame, the data amount of the I-frame in the group of pictures comprising the current frame, and a difference between a distance from the previous I-frame to the current frame and an expected fixed I-frame interval, or the third threshold is obtained by calculation according to the average data amount of frames in the group of pictures comprising the current frame and the difference between the distance from the previous I-frame to the current frame and the expected fixed I-frame interval.

4. The method according to claim 1, further comprising:
if the frame previous to the current frame is a P-frame and the data amount of the current frame is larger than a fifth threshold, or if the group of pictures comprising the current frame comprises B-frames and the data amount of the current frame is larger than a sixth threshold, determining the current frame as a P-frame, wherein the fifth threshold is a product of a first adjustment factor and the average data amount of P-frames in the group of pictures comprising the current frame, wherein the first adjustment factor is larger than 0.5 and smaller than 1, and the sixth threshold is the average of the average data amount of P-frames and the average data amount of B-frames; and
if the frame previous to the current frame is a B-frame and the data amount of the current frame is smaller than a seventh threshold, or if the group of pictures comprising the current frame comprises P-frames and the data amount of the current frame is smaller than an eighth threshold, determining the current frame as a P-frame, wherein the seventh threshold is a product of a second adjustment factor and the average data amount of B-frames in the group of pictures comprising the current frame, wherein the second adjustment factor is larger than 1 and smaller than 1.5, and the eighth threshold is the average of the average data amount of P-frames and the average data amount of B-frames.

5. The method according to claim 1, further comprising:
after frame type determination ends, determining the fixed I-frame interval, and after the fixed I-frame interval expires, if no I-frame exists, determining a frame having a maximum data amount in a specified range in the fixed interval as an I-frame; and updating average data amounts of various frames in the group of pictures and an I-frame interval parameter.

6. The method according to claim 1, further comprising:
after frame type determination ends, counting consecutive B-frames, and if a quantity of consecutive B-frames is larger than a predicted value, determining a frame having a maximum data amount among the consecutive B-frames as a P-frame, and updating average data amounts of various frames in the group of pictures, wherein the predicted value is larger than or equal to 3 and smaller than or equal to 7.

7. The method according to claim 1, further comprising:
determining whether any packet of a received frame is lost, and if packet loss occurs, determining a packet loss type;
if the packet loss type is packet loss occurred in intra frame, when calculating the data amount of the frame, determining a sum of the data amount of the received frame and the data amount of a lost packet as the data amount of the frame; and
if the packet loss type is packet loss occurred in an inter frame, determining whether a flag of a packet previous to the lost packet is 1, and if the flag of the packet previous to the lost packet is 1, counting the data amount of the lost packet into a next frame; if the flag of the packet previous to the lost packet is not 1, evenly allocating the data amount of a lost packet to the previous frame and the next frame.

8. A method for detecting frame types, comprising:
obtaining a coding type of a bitstream comprising received frames, wherein the coding type comprises open-loop coding and closed-loop coding;
if a data amount of a current frame is larger than a first threshold, determining the current frame as an obvious intra coded frame (I-frame), wherein the first threshold is obtained by calculation according to an average data amount of a specified number of consecutive frames and the data amount of an I-frame;
if the data amount of the current frame is larger than a second threshold, determining the current frame as an I-frame, wherein the second threshold is a maximum threshold of the data amount of an I-frame previous to the current frame, the average data amount of P-frames in the group of pictures comprising the current frame, and the average data amount of the specified number of consecutive frames;
if a frame previous to the current frame is an I-frame and the coding type is closed-loop coding and the current frame is a non-obvious I-frame, or if the frame previous to the current frame is an I-frame and the coding type is open-loop coding and the data amount of the current frame is larger than a fourth threshold, determining the current frame as a unidirectional predicted frame (P-frame), wherein the fourth threshold is an average of an average data amount of P-frames and an average data amount of bi-directional predicted frames (B-frames) in a group of pictures; and
if the current frame is neither an I-frame nor a P-frame, determining the current frame as a B-frame.

9. The method according to claim 8, wherein the obtaining the coding type of the bitstream comprising the received frames comprises:
counting the type of a frame next to an obvious I-frame, and if a ratio of P-frames reaches a specified ratio, determining that the coding type is closed-loop coding, if the ratio of the P-frames does not reach the specified ratio, determining that the coding type is open-loop coding.

10. The method according to claim 8, further comprising:
if an interval between the current frame and a previous I-frame is longer than a fixed interval and the data amount of the current frame is larger than a third threshold, determining the current frame as an I-frame, wherein the third threshold is obtained by calculation according to an average data amount of frames in the group of pictures comprising the current frame, the data amount of a P-frame previous to the current frame, the data amount of the I-frame in the group of pictures comprising the current frame, and a difference between a distance from the previous I-frame to the current frame and an expected fixed I-frame interval, or the third threshold is obtained by calculation according to the average data amount of frames in the group of pictures comprising the current frame and the difference between the distance from the previous I-frame to the current frame and the expected fixed I-frame interval.

11. The method according to claim 8, further comprising:
if the frame previous to the current frame is a P-frame and the data amount of the current frame is larger than a fifth threshold, or if the group of pictures comprising the current frame comprises B-frames and the data amount of the current frame is larger than a sixth threshold, determining the current frame as a P-frame, wherein the fifth threshold is a product of a first adjustment factor and the average data amount of P-frames in the group of pictures comprising the current frame, wherein the first adjustment factor is larger than 0.5 and smaller than 1, and the sixth threshold is the average of the average data amount of P-frames and the average data amount of B-frames; and
if the frame previous to the current frame is a B-frame and the data amount of the current frame is smaller than a seventh threshold, or if the group of pictures comprising the current frame comprises P-frames and the data amount of the current frame is smaller than an eighth threshold, determining the current frame as a P-frame, wherein the seventh threshold is a product of a second adjustment factor and the average data amount of B-frames in the group of pictures comprising the current frame, wherein the second adjustment factor is larger than 1 and smaller than 1.5, and the eighth threshold is the average of the average data amount of P-frames and the average data amount of B-frames.

12. The method according to claim 8, further comprising:
after frame type determination ends, determining the fixed I-frame interval, and after the fixed I-frame interval expires, if it is still determined that no I-frame exists, determining a frame having a maximum data amount in a specified range in the fixed interval as an I-frame; and updating average data amounts of various frames in the group of pictures and an I-frame interval parameter.

13. The method according to claim 8, further comprising:
after frame type determination ends, counting consecutive B-frames, and if a quantity of consecutive B-frames is larger than a predicted value, determining a frame having a maximum data amount among the consecutive B-frames as a P-frame, and updating average data amounts of various frames in the group of pictures, wherein the predicted value is larger than or equal to 3 and smaller than or equal to 7.

14. The method according to claim 8, further comprising:
determining whether any packet of a received frame is lost, and if packet loss occurs, determining a packet loss type;
if the packet loss type is packet loss occurred in an intra frame, when calculating the data amount of the frame, determining a sum of the data amount of the received frame and the data amount of the lost packet as the data amount of the frame; and
if the packet loss type is packet loss occurred in an inter frame, determining whether a flag of a packet previous to the lost packet is 1, and if the flag of the packet previous to the lost packet is 1, counting the data amount of the lost packet into a next frame, if the flag of the packet previous to the lost packet is not 1, evenly allocating the data amount of a lost packet to the previous frame and the next frame.

15. The method according to claim 14, further comprising:
predicting a coding structure by counting the detected types of frames; and
if the packet loss type is packet loss occurred in the inter frame and the flag of the packet previous to the position of the lost packet fails to be detected, dividing the length of current data according to the predicted coding structure and the position of the lost packet.

16. An apparatus for detecting frame types, comprising a program stored on a non-transient computer readable storage medium, such that when the program is executed the apparatus is configured to:
obtain a coding type of a bitstream comprising received frames, wherein the coding type comprises open-loop coding and closed-loop coding; and
if a data amount of a current frame is larger than a first threshold, determine the current frame as an obvious intra coded frame (I-frame), wherein the first threshold is obtained by calculation according to an average data amount of a specified number of consecutive frames and the data amount of an I-frame;
if the data amount of the current frame is larger than a second threshold, determine the current frame as an I-frame, wherein the second threshold is a maximum one of a data amount of an I-frame previous to the current frame, the average data amount of the P-frames in the group of pictures comprising the current frame, and the average data amount of the specified number of consecutive frames;
if a frame previous to the current frame is an I-frame and the coding type is closed-loop coding and the current frame is a non-obvious I-frame, or if a frame previous to the current frame is an I-frame and the coding type is open-loop coding and the data amount of the current frame is larger than a fourth threshold, determine the current frame as a predicted frame (P-frame), wherein the fourth threshold is an average of an average data amount of P-frames and an average data amount of bi-directional predicted frames (B-frames) in a group of pictures; and
if the current frame is neither an I-frame nor a P-frame, determine the current frame as a B-frame.

17. The apparatus according to claim 16, wherein when the program is executed the apparatus is further configured to:
if an interval between the current frame and a previous I-frame is longer than a fixed interval and the data amount of the current frame is larger than a third threshold, determine the current frame as an I-frame, wherein the third threshold is obtained by calculation according to an average data amount of frames in the group of pictures comprising the current frame, the data amount of a P-frame previous to the current frame, the data amount of the I-frame in the group of pictures comprising the current frame, and a difference between a distance from the previous I-frame to the current frame and an expected fixed I-frame interval, or the third threshold is obtained by calculation according to an average data amount of frames in the group of pictures comprising the current frame and a difference between a distance from the previous I-frame to the current frame and an expected fixed I-frame interval.

18. The apparatus according to claim 16, wherein when the program is executed the apparatus is further configured to:
if the frame previous to the current frame is a P-frame and the data amount of the current frame is larger than a fifth threshold, or if the group of pictures comprising the current frame comprises B-frames and the data amount of the current frame is larger than a sixth threshold, determine the current frame as a P-frame, wherein the fifth threshold is a product of a first adjustment factor and the average data amount of P-frames in the group of pictures comprising the current frame, wherein the first adjustment factor is larger than 0.5 and smaller than 1, and the sixth threshold is the average of the average data amount of P-frames and the average data amount of B-frames; and
if the frame previous to the current frame is a B-frame and the data amount of the current frame is smaller than a seventh threshold, or if the group of pictures comprising the current frame comprises P-frames and the data amount of the current frame is smaller than an eighth threshold, determine the current frame as a P-frame, wherein the seventh threshold is a product of a second adjustment factor and the average data amount of B-frames in the group of pictures comprising the current frame, wherein the second adjustment factor is larger than 1 and smaller than 1.5, and the eighth threshold is the average of the average data amount of P-frames and the average data amount of B-frames.

19. The apparatus according to claim 16, wherein when the program is executed the apparatus is further configured to:
determine the fixed I-frame interval after frame type determination ends;
determine a frame having a maximum data amount in a specified range in the fixed interval as an I-frame after the fixed interval expires, if no I-frame exists; and
update average data amounts of various frames in the group of pictures and an I-frame interval parameter.

20. The apparatus according to claim 16, wherein when the program is executed the apparatus is further configured to:
count consecutive B-frames after frame type determination ends;
determine a frame having a maximum data amount among the consecutive B-frames as a P-frame if the number of consecutive B-frames is larger than a predicted value, wherein the predicted value is larger than or equal to 3 and smaller than or equal to 7; and
update average data amounts of various frames in the group of pictures.

21. The apparatus according to claim 16, wherein when the program is executed the apparatus is further configured to:
determine whether any packet of a received frame is lost, and if packet loss occurs, determine a packet loss type;
if the packet loss type is packet loss occurred in intra frame, when calculating the data amount of the frame, determine a sum of the data amount of the received frame and the data amount of the lost packet as the data amount of the frame; and
if the packet loss type is packet loss occurred in inter frame, determine whether a flag of a packet previous to the lost packet is 1, and if the flag of the packet previous to the lost packet is 1, count the data amount of the lost packet into a next frame, if the flag of the packet previous to the lost packet is not 1, evenly allocate the data amount of the lost packet to the previous frame and the next frame.

* * * * *